US012657997B2

(12) United States Patent
Aikawa et al.

(10) Patent No.: US 12,657,997 B2
(45) Date of Patent: Jun. 16, 2026

(54) DICE GAMING SYSTEM COMPRISING DICE TRACKING

(71) Applicant: INTERBLOCK D.O.O., Las Vegas, NV (US)

(72) Inventors: Yoko Aikawa, Tokyo (JP); Hiromichi Ikeda, Santo Tomas (PH); Hiroatsu Ike, Tokyo (JP); Shinya Hashidume, Tokyo (JP); Waduthantiri Rasika Arunapriya De Silva, Tokyo (JP); Shunichi Fujita, Tokyo (JP); Masumi Fujisawa, Tokyo (JP); Yukinori Inamura, Tokyo (JP)

(73) Assignee: INTERBLOCK D.O.O., Menges (SI)

( * ) Notice: Subject to any disclaimer, the term of this patent is extended or adjusted under 35 U.S.C. 154(b) by 271 days.

(21) Appl. No.: 18/473,153

(22) Filed: Sep. 22, 2023

(65) Prior Publication Data

US 2024/0112535 A1 Apr. 4, 2024

Related U.S. Application Data

(60) Provisional application No. 63/413,139, filed on Oct. 4, 2022.

(51) Int. Cl.
*G07F 17/32* (2006.01)

(52) U.S. Cl.
CPC ...... *G07F 17/3241* (2013.01); *G07F 17/3211* (2013.01); *G07F 17/322* (2013.01); *G07F 17/3267* (2013.01); *G07F 17/3288* (2013.01)

(58) Field of Classification Search
None
See application file for complete search history.

(56) References Cited

U.S. PATENT DOCUMENTS

| | | | | |
|---|---|---|---|---|
| 10,540,853 | B2 | 1/2020 | Persson et al. | |
| 10,617,940 | B1 * | 4/2020 | Nadeau | A63F 3/00157 |
| 2005/0221886 | A1 | 10/2005 | Itagaki et al. | |
| 2005/0272501 | A1 | 12/2005 | Tran et al. | |
| 2009/0143141 | A1 | 6/2009 | Wells et al. | |

(Continued)

FOREIGN PATENT DOCUMENTS

| | | | |
|---|---|---|---|
| CN | 1663654 | A | 9/2005 |
| CN | 111543051 | B | 4/2022 |

(Continued)

OTHER PUBLICATIONS

International Patent Application No. PCT/US2023/075623; Int'l Search Report and the Written Opinion; dated Jan. 12, 2024; 12 pages.

(Continued)

*Primary Examiner* — Ronald Laneau
(74) *Attorney, Agent, or Firm* — BakerHostetler

(57) ABSTRACT

In one aspect, an improved craps system may comprise at least one camera and a dealer station having at least one dealer station memory, at least one dealer station display device, and at least one dealer station processor in communication with the at least one camera. The at least one dealer station processor may be configured to receive the information from the camera regarding the throw of dice and determine, based upon the information, whether the throw complies with one or more requirements for a proper throw of dice.

16 Claims, 13 Drawing Sheets

(56) References Cited

U.S. PATENT DOCUMENTS

| | | | | |
|---|---|---|---|---|
| 2018/0315276 | A1* | 11/2018 | Persson | G07F 17/3288 |
| 2019/0188969 | A1 | 6/2019 | Nelson et al. | |
| 2020/0035067 | A1* | 1/2020 | Nelson | G07F 17/3206 |
| 2020/0066106 | A1* | 2/2020 | Persson | G07F 17/322 |
| 2021/0150862 | A1 | 5/2021 | Persson et al. | |
| 2022/0392314 | A1* | 12/2022 | Persson | G07F 17/3244 |
| 2023/0330516 | A1* | 10/2023 | Kojima | A63F 9/0402 |

FOREIGN PATENT DOCUMENTS

| | | | |
|---|---|---|---|
| WO | WO 2018/227294 | A1 | 12/2018 |
| WO | WO 2022/107347 | A1 | 5/2022 |
| WO | WO 2024/076884 | A1 | 4/2024 |

OTHER PUBLICATIONS

International Patent Application No. PCT/US2023/075623; Int'l Preliminary Report on Patentability; dated Oct. 11, 2024; 17 pages.

* cited by examiner

DICE GAMING SYSTEM COMPRISING DICE TRACKING

CROSS-REFERENCE TO RELATED APPLICATIONS

The present application claims the benefit of U.S. Provisional Application No. 63/413,139, entitled "Dice Gaming System Comprising Dice Tracking," filed Oct. 4, 2022, the disclosure of which is hereby incorporated herein in its entirety.

BACKGROUND

Field of the Invention

The present disclosure relates to improvements to gaming systems or tables and more specifically to dice-based tables or dice-based systems such as for Craps and Sic Bo, configured to determine information related to the dice, such as the number of dice, the outcome or results of a throw of a dice and/or whether the throw of the dice may comply with one or more requirements for a proper throw of dice.

Description of Related Technology

Craps is a popular casino game that purportedly is well over 100 years old. Players enjoy playing craps for various reasons, and often times craps tables are the loudest locations in casinos from the excited yelling by its players. Players appear to enjoy the camaraderie of playing against the house while also having the ability to bet with or against other players who may be acting as the shooter.

However, craps games can have significant overhead combined with potential security concerns. A typical craps table may require two to three dealers or attendants, who work together to track and settle various bets, retrieve the dice, and generally maintain the order of the table. Additionally, as players are in close proximity to the play area or "play field" of a craps table, significant security assets are dedicated to watching hand movement at the table, especially in the proximity of the various wagers. Craps can also be a slow game, as the attendants are required to track the persons making various bets, determine the results of dice rolls, correctly make payouts where appropriate, and on occasion, replace wagers to their proper locations when they are struck by the thrown dice, which all takes time. Attendants are often asked various questions by players and have to correct player behavior, as craps can appear confusing to the novice player.

Other casino table games have undergone significant automation in recent years, in an effort to improve both efficiency and security. There is an entire sector of the automated games, often referred to as an electronic table game (ETG), or an e-table game. However, attempts to automate craps have not proven successful, primarily because it is believed that one of the most desirable aspects of craps is the physical rolling of the dice by actual players, which place physical limitations on the actual craps table. Sic Bo is another dice-based game that is popular in some jurisdictions, but has largely been modified to prevent the player from touching or throwing the dice so as to simplify the game play for both the casino and player.

SUMMARY

The present disclosure relates to dice systems or dice tables comprising elements that improve the security and flow of a dice game such as craps. In embodiments, a craps system may comprise a play surface, at least one bumper wall, at least one camera and at least one dealer station. The at least one dealer station may comprise at least one dealer station memory, at least one dealer station display device, and at least one dealer station processor configured to communicate with the at least one camera, and the at least one dealer station memory device, and the at least one dealer station display device. The at least one dealer station processor may be configured to receive from the at least one camera information relating to a throw of dice for a play of a craps game and determine, based at least in part upon the information received, whether the throw of the dice complies with one or more requirements for a proper throw of craps for a play of a craps game.

In embodiments, the determination of whether the dice complies with the one or more requirements for a proper throw of dice may comprise at least one of: (i) determining whether the dice hit the first bumper wall or the second bumper wall, (ii) determining whether the dice hit the first bumper wall when the physical dice should have hit the second bumper wall, (iii) determining whether the dice hit the second bumper wall when the dice should have hit the first bumper wall, (iv) determining whether one or more of the dice did not come to a stop on the play field, (v) determining whether the dice tumbled, or (vi) determining whether the dice tumbled less than a predetermined number of times.

In further embodiments, the at least one dealer station processor is configured to cause the at least one dealer station display device to display information related to the determination of whether the throw of the dice complies with the one or more requirements for a proper throw of dice, and determine whether to proceed with the play of the craps game based at least in part upon the determination of whether the throw of the dice complies with the one or more requirements for a proper throw of dice and input received by the dealer station from the dealer using the displayed information on the at least one dealer station display device related to the determination of whether the throw of the dice complies with the one or more requirements for a proper throw of dice.

In still further embodiments, the at least one dealer station processor may be configured to, based upon information received from the at least one camera relating to dice, determine a number of the dice on the play field and proceed with a play of the craps game when the determined number of dice is equal to a predetermined number of dice. In embodiments, the proceeding with a play of the craps game may be a progression from a first game state to second game state of the craps game, for example, from a dice selection state to a dice shoot state, or any other game state progressions.

In additional embodiments, the at least one dealer station processor may be configured to cause the at least one dealer station display device to display information related to the determination of the outcome of the dice throw, and cause the at least one dealer station processor to request input into the dealer station to confirm or reject the determination of whether the results of the dice throw.

In yet further embodiments, the at least one dealer station processor may be configured to, receive information from the at least one camera relating to the dealer(s) or player(s) of the craps game, and send the information from the at least one camera relating to the dealer(s) or player(s) of the craps game to at least one display device associated with the craps table.

Some embodiments include a method for controlling a craps system. Such a method may be performed by a computer processor of a craps system or performed remote from the craps system. A method for controlling a craps system may include receiving from the at least one camera information relating to a throw of dice for a play of a craps game and determining, based at least in part upon the information received from the at least one camera relating to the throw of the dice for a play of a craps game, whether the throw of the dice complies with one or more requirements for a proper throw of dice, the determination of whether the throw of the dice complies with one or more requirements for a proper throw of dice comprising at least one of: (i) determining whether the dice hit the first bumper wall or the second bumper wall, (ii) determining whether the dice hit the first bumper wall when the dice should have hit the second bumper wall, (iii) determining whether the dice hit the second bumper wall when the dice should have hit the first bumper wall, (iv) determining whether one of the dice did not come to a stop on the play field, (v) determining whether the dice tumbled, and (vi) determining whether the dice tumbled less than a predetermined number of times. Information related to the determination of whether the throw of the dice complies with one or more requirements for a proper throw of the dice may be output to a dealer station. A determination of whether to proceed with the play of the craps game based at least in part upon (a) the determination of whether the throw of the dice complies with one or more requirements for a proper throw of dice, and (b) input received at the dealer station related to the determination of whether the throw of the dice complies with one or more requirements for a proper throw of dice, and the an indication of the determination of whether to proceed with the play of the craps game may be output, for example to a dealer station, another display device associated with the craps system, or to a system for paying winning wagers placed on the throw of the dice.

Figure 1:
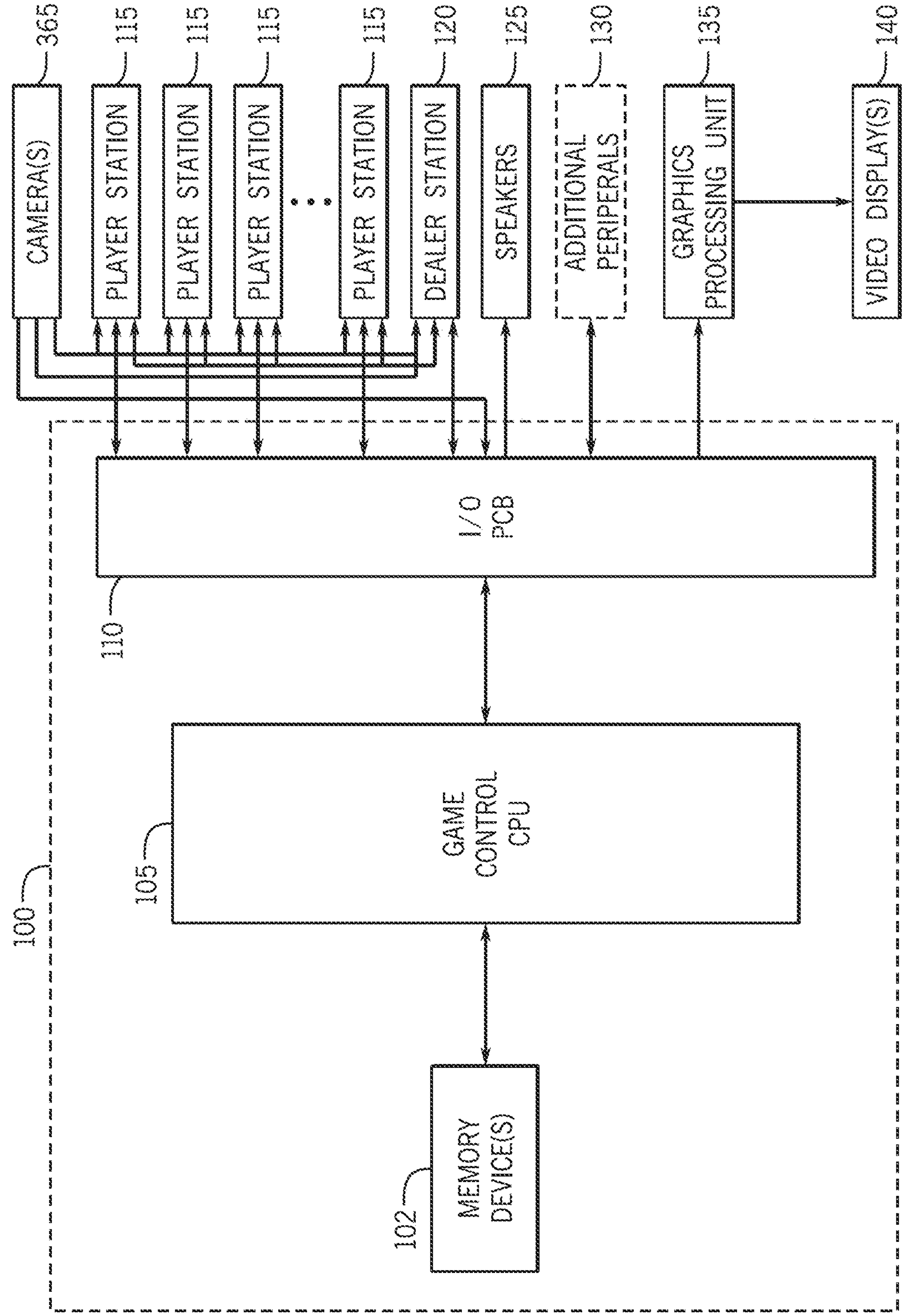
FIG. 1 is a schematic view of a craps table, according to embodiments of the craps systems of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples consistent with the description; however, the description is not limited to the examples provided in the drawings.

DETAILED DESCRIPTION

FIG. 1 is a schematic view of a craps table according to embodiments of craps systems of the present disclosure. Arrowed lines are shown to generally illustrate the contemplated flow of communications between components. The craps table illustrated in FIG. 1 is a hybrid craps table, which is discussed in further detail in U.S. application Ser. No. 15/963,922 (U.S. Pat. No. 10,540,853), the entire contents of which is incorporated herein for all purposes. It should be appreciated, however, that the craps table illustrated in FIG. 1 (or any of the other craps tables or craps systems discussed herein) may alternatively be a traditional craps table. In embodiments, the craps table illustrated in FIG. 1 may comprise at least one secure area 100 to house sensitive components. While FIG. 1 illustrates several components within secure area 100, additional components may be located within secure area 100 or additional secure areas may be associated with the hybrid craps table. The craps table may comprise at least one game controller memory device 102 in communication with a game control central processing unit (CPU) 105. Game Control CPU 105 can perform arithmetic and logical operations, and also extract instructions from game controller memory device(s) 102 and decode and execute them. Game control CPU 105 may comprise at least one processor. Alternatively, it is contemplated that instead of CPU 105, an array processor or vector processor having multiple parallel computing elements, which utilizes a distributed computing model, may be used to perform such arithmetic and logical operations. The game control CPU 105 may also be referred to as a game controller herein.

Game controller memory device(s) 102 can include one or more distinct types of memory devices, such as random access memory (RAM) or dynamic RAM (DRAM), which can include non-volatile RAM (NVRAM), magnetic RAM (MRAM), ferroelectric RAM (FeRAM) and other forms as commonly understood in the computing industry. In embodiments, the game controller memory device(s) 102 includes read only memory (ROM), which may, for example, store regulatory-sensitive instructions for the hybrid craps table. In one embodiment, the game controller memory device(s) 102 includes flash memory and/or EEPROM (electrically erasable programmable read only memory). Any other suitable magnetic, optical and/or semiconductor memory may operate in conjunction with the hybrid craps table disclosed herein.

In some embodiments, game controller memory device(s) 102 store program code that is executable by game control CPU 105. Game controller memory device(s) 102 may also store operating data, such as a random number generator (RNG), game instructions, event data, display files, game history data, and other such data and instructions that allow for a gaming device to properly function in a regulated environment.

Game Control CPU 105 may be communicatively connected to at least one input/output printed circuit board (I/O PCB) 110 which operates as an electrical interface between Game Control CPU 105 and access stations and various peripherals of the hybrid craps table. FIG. 1 further illustrates CPU 105 communicating with a plurality of player stations 115, at least one dealer station 120 and at least one camera 365, which may comprise one or more camera(s) such as example cameras 365*a*-365*d*, discussed further below. The at least one camera 365 may be a high speed camera or any other camera suitable for sensing and tracking dealers and players of a craps game along with the throw of dice, the outcome of craps, and/or a number of dice on a craps table as discussed herein. In embodiments, the at least one camera 365 herein may comprise specialized cameras and specialized software.

In embodiments, player stations 115 may be the primary mechanism for the placement and settlement of wagers on the hybrid craps table. In other embodiments, the at least one dealer station 120 allows the dealer to manage the craps game played at the hybrid craps table, as discussed more below. The one or more camera(s) 365 may be in communication with the game control CPU 105 and/or the dealer station 120 as illustrated and discussed further below.

FIG. 1 also illustrates other contemplated peripherals, including speakers 125, and other additional peripherals 130. Also illustrated is a graphic processing unit (GPU) 135, which works in coordination with game control CPU 105 to control the video display(s) 140 contemplated herein, and causes them to display various aspects of a game. It should be appreciated that while FIG. 1 illustrates game control CPU 105, game control memory device(s) 102, and player stations 115, in various embodiments herein, the craps table, craps game or craps systems may exclude one or more of the game control CPU 105 (including memory device(s) 102 and I/O PCB 110) and players stations 115, e.g., for traditional craps table or craps system embodiments.

An example additional peripheral 130 may include an automated dice recognition system. In embodiments not depicted in FIG. 1, an automated dice recognition system may be communicatively coupled with dealer station 120, player stations 115, and/or I/O PCB 110. An automated dice recognition system may sense and track the results of a dice throw, the number of dice on the play field, and/or the throw of the dice. An automated dice recognition system may comprise, for example, communication circuitry within the dice, which are configured to communicate with a complimentary electronic system located in close proximity to the play field. The communication can be by way of, for example, WiFi, Bluetooth, NFC, RFID, accelerometers, or other similar manners. In such embodiments, it is contemplated that the results of the dice throw are automatically tracked an communicated to the system.

In examples, an automated dice recognition system may utilize RFID and RFID tags may be embedded on each face of the dice utilized in the play of a game. In further examples, one or more RFID readers are located near the play field, and are configured to flow current to an associated antenna or antennas based on instructions received from an associated or processor, which causes the transmittal of a predetermined command to the RFID tags. In one example, such antennas are loop-shaped. Then, a magnetic field is altered within the area surrounded by the antenna or antennas in which the current flowed. Along with the alteration of magnetic flux in this magnetic field, electromotive force is generated within the antenna that is included in the RFID tag which is disposed within the area. Herewith, electric power is transmitted to the RFID tag, whereby communication with the RFID tag is performed.

In further embodiments, several antennas are associated with each RFID reader. In one example, each such antenna is positioned so that at least a portion of each of the detection areas are overlapping. In yet additional embodiments, dice having RFID tags also comprise one or more accelerometers. In one example of such an embodiment, the accelerometers are configured to communicate with the dice recognition system when the associated dice does not land fairly on the play surface, for example, when a dice lands resting at an angle against a bumper wall.

In still other embodiments, an automated dice recognition system may be located only at one end of the craps table, and would require that all throws occur from the opposite end of the craps table. In other embodiments, one or more automated dice recognition systems may be positioned to detect dice at both ends of the craps table.

Figure 2:
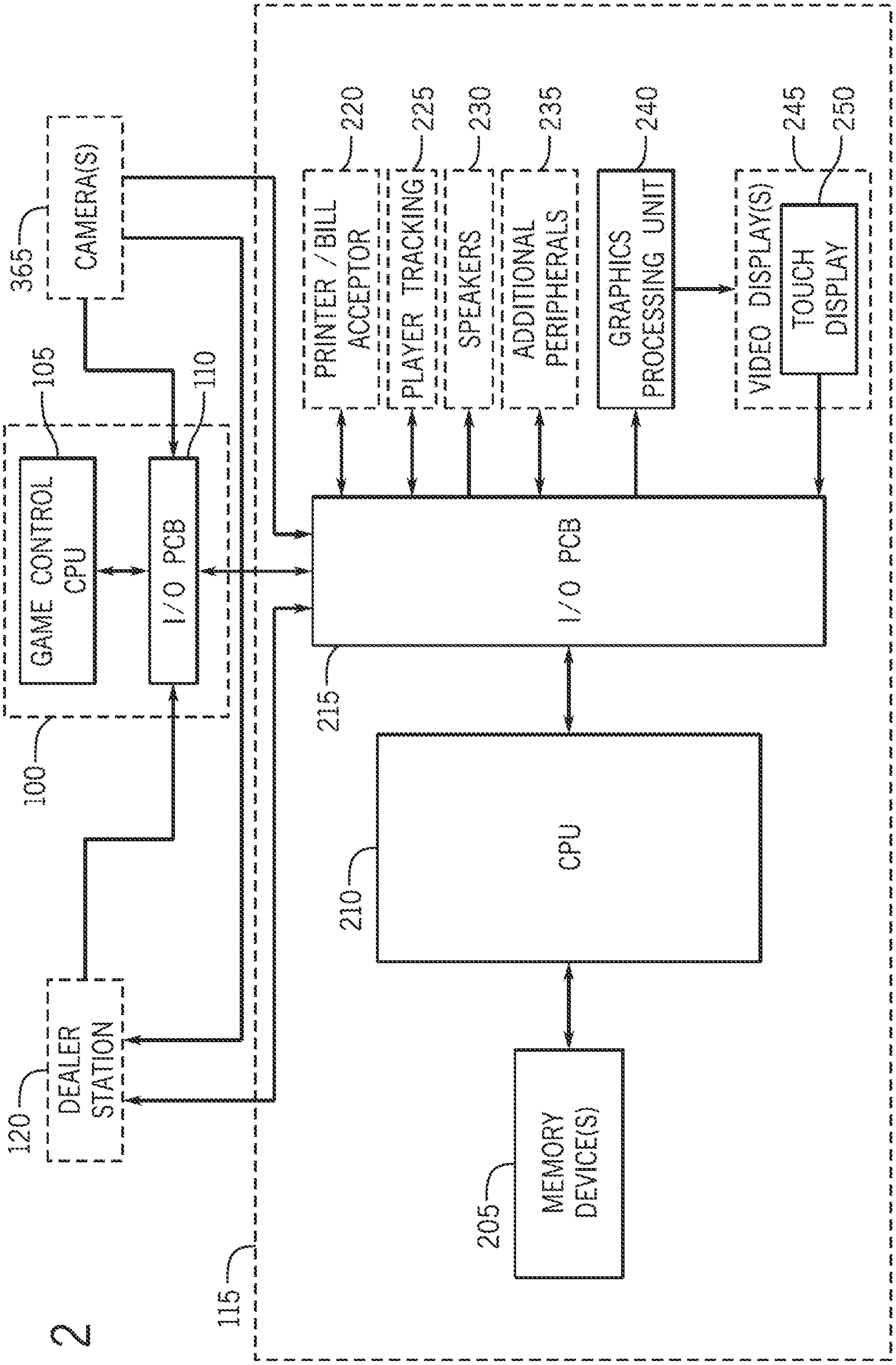
FIG. 2 is a schematic view of a player station, according to embodiments of the craps systems of the present disclosure.

FIG. 2 is a schematic illustration of an example player station 115 according to embodiments of the craps system of the present disclosure. In these embodiments, at least one player station memory device 205 may be in communication with a player station CPU 210. Player station CPU 210 can perform arithmetic and logical operations, and also extract instructions from player station memory device(s) 205 and decode and execute them. Player station CPU 210 may comprise at least one processor. Alternatively, it is contemplated that instead of player station CPU 210, an array processor or vector processor has multiple parallel computing elements, which utilizes a distributed computing model, to perform such arithmetic and logical operations. The player station CPU 210 may also be referred to as a player station controller herein. FIG. 2 further illustrates player station CPU 210 communicating with the at least one dealer station 120 and the at least one camera 365, which in examples may comprise the one or more of camera(s) 365*a*-365*d* discussed further below. FIG. 2 further illustrates dealer station 120 communicating with the at least once camera 365 and the game control CPU 105.

Player station memory device(s) 205 can include one or more distinct types of memory devices, such as random access memory (RAM) or dynamic RAM (DRAM), which can include non-volatile RAM (NVRAM), magnetic RAM (MRAM), ferroelectric RAM (FeRAM) and other forms as commonly understood in the computing industry. In embodiments, the player station memory device(s) 205 include read only memory (ROM), which may, for example, store regulatory-sensitive instructions for the hybrid craps table. In embodiments, the player station memory device(s) 205 include flash memory and/or EEPROM (electrically erasable programmable read only memory). Any other suitable magnetic, optical and/or semiconductor memory may operate in conjunction with player station 115.

In some embodiments, player station memory device(s) 205 store program code that is executable by player station CPU 210. Player station memory device(s) 205 may also store operating data, such as an RNG, game instructions, event data, display files, game history data, and other such data and instructions that allow for a gaming device to properly function in a regulated environment.

Player station CPU 210 is communicatively connected to at least one input/output printed circuit board (I/O PCB) 215, which operates as an electrical interface between player station CPU 210 and the game control CPU 105 via the I/O PCB 110, and various peripherals of player station 115. FIG. 2 further illustrates communicating with a plurality peripherals, such as a printer/bill acceptor 220. It is contemplated that by incorporating a printer/bill acceptor 220, casinos can do away with traditional betting chips as are common on typical craps tables. This can provide numerous benefits to casinos, including improving security as then all wagers and payouts can be tracked electronically. This can also provide a cleaner table surface for throwing dice, as there are no chips that may be accidentally hit by thrown dice. It is also contemplated that similar benefits can be derived from a system where the player station 115 does not include a printer/bill acceptor, but rather the dealer station 120 does. In such an embodiment, a player can hand their money to the dealer/attendant, who inputs the transaction into dealer station 120, which can then cause the appropriate player station 115 to be credited with the proper amount of credits, which the player can then use to wager and play with.

FIG. 2 also illustrates the contemplated inclusion of a player tracking peripheral 225. If casinos want to take on the burden of tracking craps players, attendants at craps tables typically estimate the amount of play by any particular player, and must then manually input such estimation into an associated player tracking manager system. However, such systems are hard to properly run and can lead to players having their play/wagers underreported or overreported, which are both detrimental to a casino's player tracking program. In the current embodiment, by allowing players to immediately associate their play with their player tracking account, for example by inserting their player tracking card into the player tracking peripheral 225, they are able to be accurately monitored. This can lead to both reduced costs for casinos, as they will only provide awards to players who actually meet their award criteria, and increased enjoyment by players, as their level of play will accurately be recorded, which can lead to increased awards.

FIG. 2 also illustrates other contemplated peripherals, including speakers 230, and other additional peripherals 235. Also illustrated is a graphic processing unit (GPU) 240, which works in coordination with player station CPU 210 to control the video display(s) 245 of the player station 115, and causes them to display various aspects of a graphical user interface (GUI) for the hybrid craps table. It is further contemplated that the video display(s) 245 include a touch display 250, also referred to as a touchscreen, which is configured to receive various inputs from a player. As illustrated in FIG. 2, it is contemplated touch display 250 is configured to communicate back to player station CPU 210 via I/O PCB 215. In one embodiment, the touch display 250 would allow a player to touch portions of the screen in order to input selections or other commands. Here again, it should be appreciated that while FIG. 2 illustrates game control CPU 105, game control memory device(s) 102, and player stations 115, in various embodiments herein, the craps game or craps systems may exclude one or more of the game control CPU 105 (including memory device(s) 102 with I/O PCB 215) players stations 115 (including memory devices 205 and I/O PCB 215), peripherals including speakers 230, and other additional peripherals 235 along with graphic processing unit (GPU) 240 and video display 245, e.g., for traditional craps tables or craps system embodiments.

Figure 3:
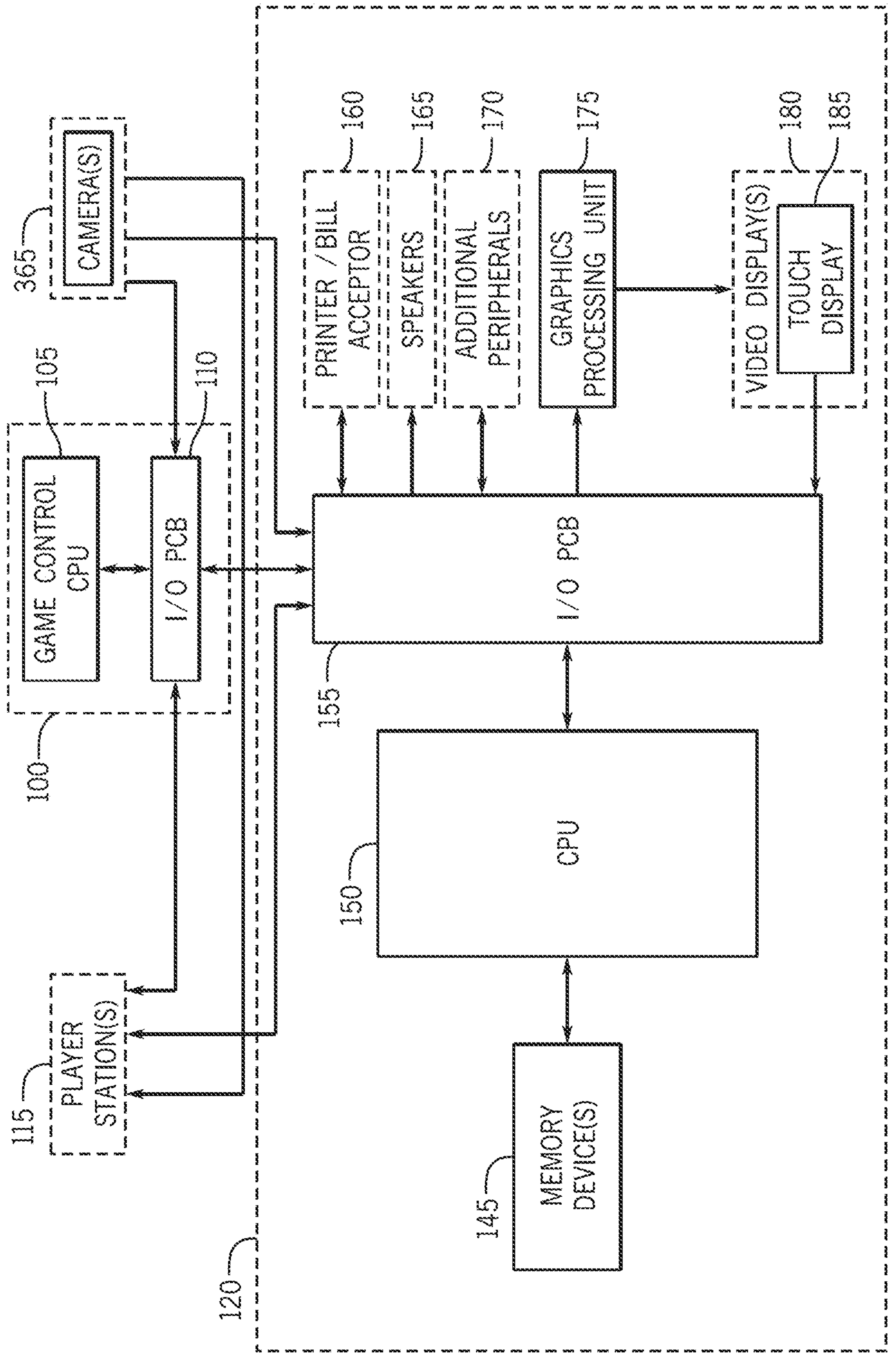
FIG. 3 is a schematic view of a dealer station, according to embodiments of the craps systems of the present disclosure.

FIG. 3 is a schematic illustration of a dealer station 120 in accordance with embodiments of the craps systems of the present disclosure. In these embodiments, dealer station memory device(s) 145 may be in communication with a dealer station processor or dealer station central processing unit CPU 150. Dealer station processor 150 can perform arithmetic and logical operations, and also extract instructions from dealer station memory device(s) 145 and decode and execute them. Dealer station processor 150 may comprise at least one processor. Alternatively, it is contemplated that instead of dealer station processor 150, an array processor or vector processor has multiple parallel computing elements, which utilizes a distributed computing model, to perform such arithmetic and logical operations. The dealer station processor 150 may also be referred to as a dealer station controller herein. FIG. 3 further illustrates dealer station 120 communicating with game control CPU 105, the player stations 115, and the at least one camera 365, which may comprise one or more of the examples camera(s) *365a-365d* discussed further below. FIG. 3 further illustrates player stations 115 communicating with the at least once camera 365 and the game control CPU 105 and the at least one camera communicating with the game control CPU 105.

Dealer station memory device(s) 145 can include one or more distinct types of memory devices, such as random access memory (RAM) or dynamic RAM (DRAM), which can include non-volatile RAM (NVRAM), magnetic RAM (MRAM), ferroelectric RAM (FeRAM) and other forms as commonly understood in the computing industry. In embodiments, the dealer station memory device(s) 145 include read only memory (ROM), which may, for example, store regulatory-sensitive instructions for the hybrid craps table. In embodiments, the player station memory device(s) 145 include flash memory and/or EEPROM (electrically erasable programmable read only memory). Any other suitable magnetic, optical and/or semiconductor memory may operate in conjunction with dealer station 120.

In embodiments, dealer station memory device(s) 145 store program code that is executable by the dealer station processor 150. Dealer station memory device(s) 145 may also store data from one or more of the cameras 365 (e.g., video data relating to the physical throw of the dice, the outcome of the dice, the number of dice or any other data captured by the at least one camera 365), operating data, such as an RNG, game instructions, event data, display files, game history data, and other such data and instructions that allow for a gaming device to properly function in a regulated environment.

Dealer station processor 150 may be communicatively connected to at least one input/output printed circuit board (I/O PCB) 155, which operates as an electrical interface between game control CPU 105 via the I/O PCB 110, the at least one camera 365, the player station(s) 115 via I/O PCB 215, and any peripherals of dealer station 120. FIG. 2 further illustrates communicating with a plurality of peripherals, such as a printer/bill acceptor 160. It should be appreciated that in various embodiments, e.g., traditional craps tables or systems, no printer/bill acceptor may be used. The printer/bill acceptor can provide numerous benefits to casinos, including improving security as then all wagers and payouts can be tracked electronically. This can also provide a cleaner table surface for throwing dice, as there are no chips that may be accidentally hit by thrown dice. It is also contemplated that similar benefits can be derived from a system where the dealer station 120 does not include a printer/bill acceptor, but rather the player station 115 does. In embodiments where the dealer station 115 includes a printer/bill acceptor, a player may be able to hand their money to the dealer/attendant, who inputs the transaction into dealer station 120, which can then cause, for example, an appropriate player station 115 to be credited with the proper amount of credits, which the player can then use to wager and play with. Again, it should be appreciated that while FIG. 3 illustrates game control CPU 105, game control memory device(s) 102, and player stations 115, in various embodiments herein, the craps game, craps tables or craps systems may exclude one or more of the game control CPU 105 (including memory device(s) 102 with I/O PCB 215) players stations 115 (including memory devices 205 and I/O PCB 215), e.g., for traditional craps table or craps systems embodiments.

FIG. 3 also illustrates other contemplated peripherals or components of dealer station 120, including speakers 165, and other additional components of dealer station 120 or peripherals 170. Also illustrated is a graphic processing unit (GPU) 175, which in embodiments, may work in coordination with dealer station processor 150 to control video display(s) 180 of dealer station 120, and cause the video display(s) 180 to display various aspects of a graphical user interface (GUI) for the craps table. It is further contemplated that the video display(s) 180 may include a touch display 185, which may be referred to as a touchscreen. Touch display 185 may be configured to receive various inputs from a dealer or attendant and communicate back to dealer station processor 150 via I/O PCB 155. In embodiments, the touch display 185 may allow a dealer to touch portions of the screen in order to input selections or other commands. Thus, it should be appreciated from the foregoing that dealer station 120 may include at least one input device, such as touch display 185 or any other suitable input device(s), which allows a dealer to input commands. In various embodiments, the input device of the dealer station 120 may comprise other input devices, such as one or more physical buttons. In further embodiments, touch display 250 is a multi-touch display.

Figure 4:
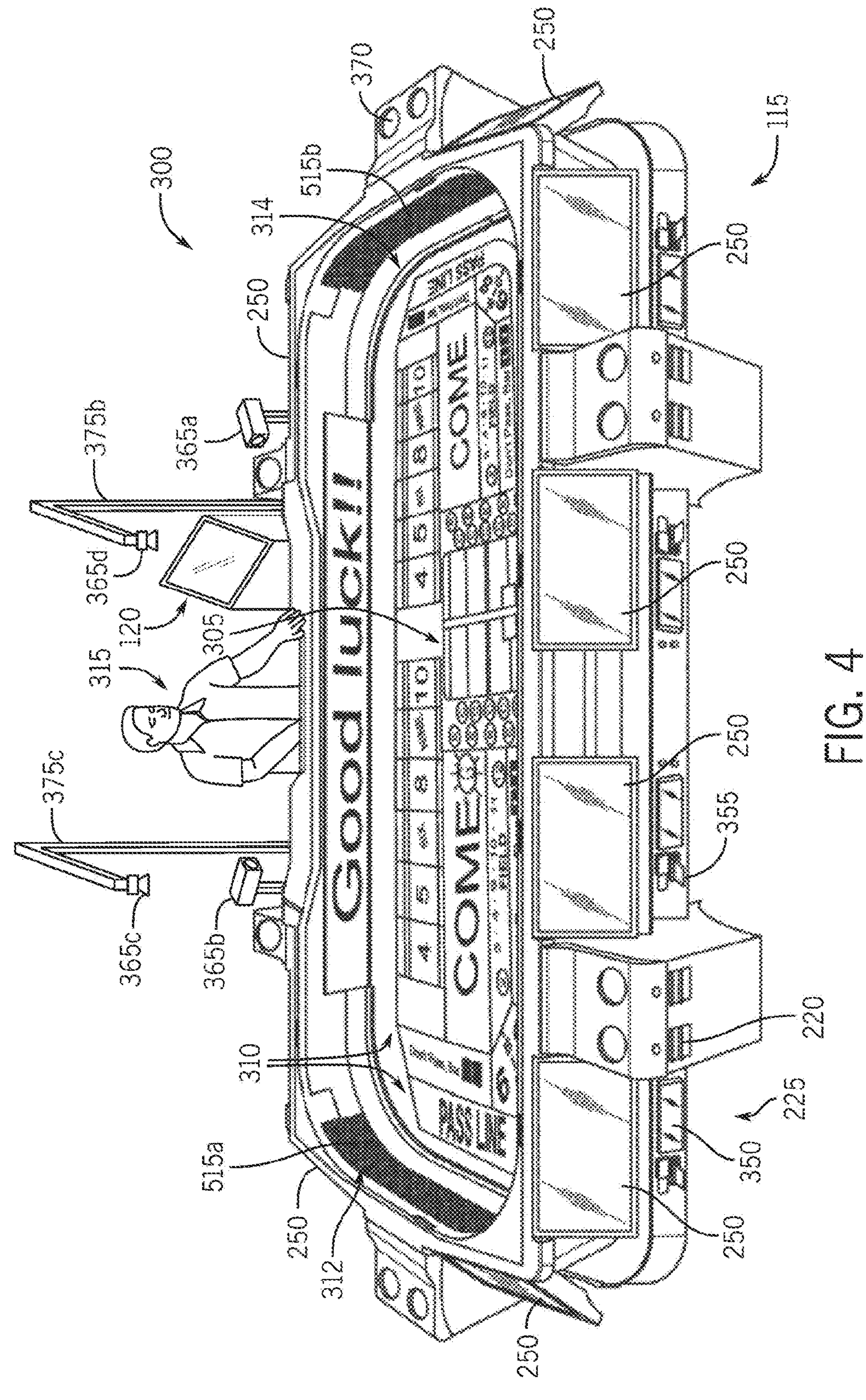
FIG. 4 is a perspective view of a craps table, according to embodiments of the craps systems of the present disclosure.

Turning now to FIG. 4, FIG. 4 illustrates a craps table 300 in accordance with embodiments of the craps systems of the present disclosure. While FIG. 4 illustrates a hybrid craps table, it should again be appreciated that table 300 or any of the craps systems or craps tables of the present disclosure may alternatively be traditional craps tables. Craps is a well-understood game in the field of casino gaming, and the various typical bets available are not discussed in detail here. However, it is understood that a craps table layout will generally include a wagering area, generally shown at 305, and the remainder of the table area, generally shown at 310. Collectively, these are often referred to as the play field, as this area is where the dice are thrown. The remainder of the table area 310 of the play field may comprise a first end portion 312 and a second end portion 314 opposite the first end portion 312. The first end portion 312 may be located at a first longitudinal end of the craps table 300, while the second end portion may be located at a second longitudinal end of the craps table 300. Craps table 300 may also comprise a specific area for the attendants or dealers, generally shown at 315. The craps table 300 may further comprise at least one bumper wall positioned adjacent to the play field. In embodiments, the at least one bumper wall may comprise only one bumper wall or at least two bumper walls. In FIG. 4, the table comprises at least a first bumper wall 515*a* and a second bumper wall 515*b*. First bumper wall 515*a* may be positioned adjacent to the play field at the first end portion 312 of the play field. The second bumper wall 515*b* may be positioned adjacent to the play field at the second end portion 314 of the play field. In embodiments, the first and second bumper walls, or portions thereof, may be considered first and second gator walls.

Craps table 300 may further comprise the dealer station 120, which may be part of, generally adjacent to, or otherwise associated with the area 315 for the attendant or dealer. It should be appreciated that in other embodiments, dealer station 120 may be located at any suitable position for an attendant or dealer of a craps table. As is evident from FIG. 4, craps table 300 may be quite large, which can present several challenges for players. One challenge might be to visually see what the rolled dice actually land on, as the dice are small and can be thrown towards the opposite end of the table. Another challenge can be to place the wagers on all of the bets a player desires to wager on, as the player may not be able to reach each wagering area 305. This is another reason that typical craps tables may have multiple attendants, so that they can facilitate such wagers from their central location.

Craps table 300 may further comprise several player stations 115. Each player station 115 may be positioned around the perimeter of the craps table 300 in a manner to allow players to utilize the player station 115 while also having the ability to view the playing surface of the hybrid craps table 300. In embodiments, certain player stations 115 may be sized and positioned in a manner so as to allow a player to also throw dice. In various embodiments, player station 115 may be moveably connected to the hybrid craps table 300, so as to allow it to be moved slightly to allow better access for a player to throw the dice. In further embodiments, portions of player station 115, for example touch display 250, may be moveably connected to the hybrid craps table 300. Again, in various embodiments, such as traditional craps tables or systems, the table 300 may have no such illustrated player stations 115 or touch displays 250.

Each player station 115 may comprise a printer/bill acceptor 220, which may be configured to accept tangible mediums of currency, such a physical/paper bills and tickets. In other embodiments, printer/bill acceptor 220 may be comprised of multiple components, such as a separate currency acceptor and printer. In such embodiments, the currency acceptor may be a coin acceptor that accepts coins. In still others embodiment, craps table 300 includes more than one currency acceptor, such as one for coins, one for paper bills, and/or one for tickets. In other embodiments, printer/bill acceptor 220 can accept multiple denominations of currency, or even currencies from multiple countries. In still another embodiment, printer/bill acceptor 220 can accept a ticket or similar physical indicium that is distributed by a casino or another gaming machine, which indicates an amount of currency available for wagering. In a further embodiment, printer/bill acceptor 220 can accept credit cards, debit cards, prepaid cards, or other instruments to initiate an electronic funds transfer. It is also contemplated that instead of a printer/bill acceptor 220, craps table 300 may provide others means to allow a player to access money in order to wager on a play of the game. For example, the player may enter a personal identification number (PIN) in order to access an account they have, either with a bank or the casino itself, and upon entering the PIN and other information, certain amount of funds are transferred to the player station 115 or otherwise allowed to be wagered in relation to craps table 300. In another embodiment, printer/bill acceptor 220 is configured to interact with a radio frequency identification (RFID), a Bluetooth, a near-field communication (NFC), a WiFi, and/ or other short-range or medium-range communication device which can transmit financial information short and/or medium distances, for example a bracelet, smart watch, smart phone, or other similar devices.

Player stations 115 may also include an input device, such as touch display 250, which allows a player to input commands, such as placing a wager on a play of a craps game. In another embodiment, player stations 115 include other input devices, such as physical buttons. In a further embodiment, touch display 250 may comprise a multi-touch display.

Player stations 115 also show as being associated with a player tracking device, generally shown at 225. In this example, player tracking device includes player tracking card reader 355, and player information display 350. It is contemplated that such a player information display 350 can be utilized to communicate with the player. It is contemplated that such player information display 350 can be a liquid crystal display (LCD), a plasma display, an electroluminescent (EL) display, an organic light emitting diode (OLED) display, an LED dot matrix type of display, or can be any other type of display suitable for smaller displays. It is contemplated that player station 115 can include a visibly distinct player tracking device 225, or a visually integrated player tracking device that utilizes a portion of video display and possibly also an associated touch display in order to interact with a player. In practice, a player makes their identity known to the player tracking device 225, either actively by inserting a player tracking card into a player tracking card reader 355 and/or entering a PIN into an associated keypad or a touch interface incorporated with player information display 350, or passively by utilizing a location device, such as an RFID tag, a Bluetooth, a near-field communication (NFC), a WiFi, and/or other short-range or medium-range communication device which can transmit information short and/or medium distances, for example a bracelet, smart watch, smart phone, or other similar devices. Thereafter, the player tracking device 225 communicates over a network with a casino tracking system to track a player's play, and potentially offer awards or other services to the player, often through the same player tracking device 225. The player tracking device 225 can also display, via player information display 350, player status information back to the player, or other information based on or otherwise related to a player's play history and/or status, including awards earned by a player. It is also contemplated that the networked player tracking device 225 can be utilized to offer other services to players, such as the ordering of drinks, or making promotional offers to a player, perhaps working in coordination with printer/bill acceptor 220 to do so.

It is also contemplated that craps table 300 may facilitate the use of promotional or non-cashable credits on a play of craps. As craps games have historically been difficult to automate, providing players the ability to wager with promotional credits has proven difficult and inefficient. However, providing the ability to accept electronic wagers, the hybrid craps tables provide an efficient way to allow a player to redeem and wager such promotional credits. For example, a player may receive notification on the player information display 350 of a number of promotional credits they are able to redeem. The player may then input, via a touch display associated with player information display 350, their desire to redeem such promotional credits, which may then be communicated to a promotional credit meter associated with player station 115, for example displayed on touch display 250. The player may then wager the credits on various craps bets, and any winnings may then be added to a regular credit meter associated with player station 115. The player may then cash out such credits derived from winning wagers.

Craps table 300 may also comprise integrated drink areas 370, which may be advantageously placed close to player station 115, but may also be in an area where an accidental spill will not affect sensitive components of the craps table 300. By providing drink area 370 atop printer/bill acceptor 220, combined with a depression to help collect minor spills and/or condensation, it is contemplated that damage from any such spills is minimized.

In embodiments, craps table 300 may include a cover, such as a dome, over the play field which allows the viewing of the play field but not the physical interaction with the play field by a player. In one example, as discussed more below, the player does not throw physical dice with the game and the hybrid craps table utilizes virtual dice or automated dice throwing mechanisms to simulate the throw of dice.

Figure 5A:
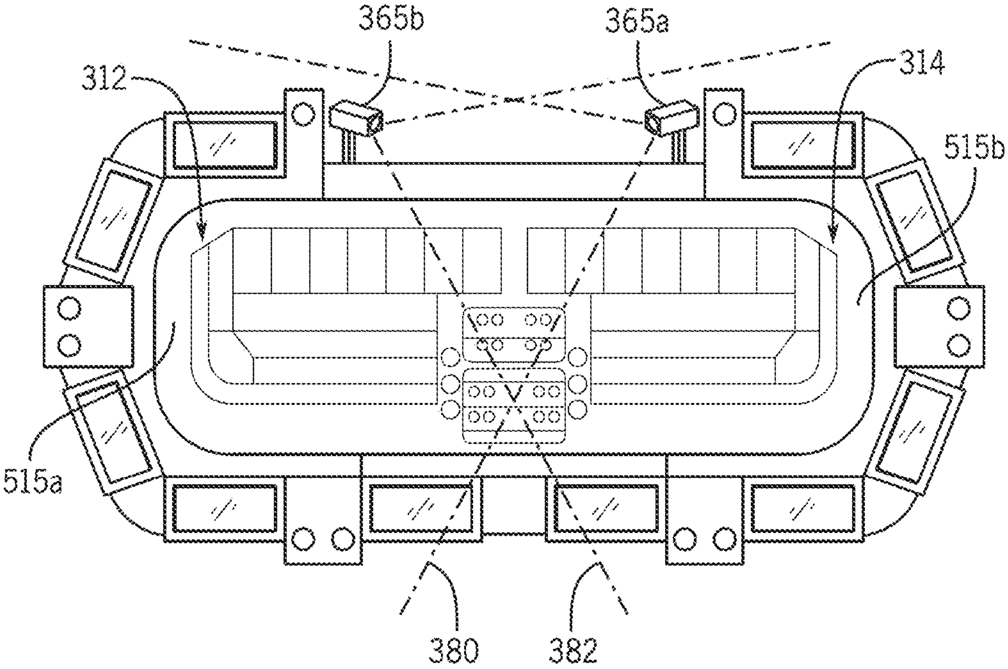
FIG. 5A is a top view of a craps table showing example cameras having example fields of view, according to embodiments of the craps systems of the present disclosure.

Craps table 300 may further comprise the at least one camera 365. In various embodiments, the at least one camera 365 may comprise a plurality of cameras. The plurality of cameras 365 in embodiments may comprise one or more cameras positioned on or near a perimeter of the craps table 300 at a height slightly above the top of the play field so that the cameras point at an angle close to horizontal or parallel with a top surface of the play field, e.g., cameras 365*a*, 365*b* illustrated in FIG. 4. The one or more cameras positioned on or near a perimeter of the craps table 300 at a height slightly above the top of the play field so that the cameras point at an angle close to horizontal or parallel with a top surface of the play field may comprise a single camera or more than two cameras in embodiments. In embodiments, camera 365*a* may be configured to comprise a field of view 380 (See, FIG. 5A) that encompasses at least a portion of the craps table 300, such as at least a first longitudinal half portion of the craps table 300. In further embodiments, camera 365*b* may be configured to comprise a field of view 382 (See, FIG. 5A) that encompasses at least another portion of the craps table 300, such as at least a second longitudinal half portion of the craps table.

As would be appreciated, in one example, a player located at a position of the player station 115 utilizing the touch display 250 located at the left most end of craps table 300 illustrated in FIG. 4 would be required to throw dice from their position at that player station 115 towards the longitudinal end opposite from that position. In this example, the player would be required to throw dice from their position at that player station towards the end 314 of the play field so that the dice will hit against the bumper wall 515*b*. The one or more camera in this example, e.g., camera 365*b*, may be configured to comprise a field of view 382 (See, FIG. 5A) that captures, for example, information related to the throw of the dice and the outcome or results of the throw of the dice. It should be appreciated that the craps table 300 in embodiments may have a center line generally located at or near the longitudinal center of the craps table and which generally splits the player stations into table halves, thereby requiring each player to throw dice from their respective player position to an opposite end (e.g., either end 314 or end 312 in FIG. 4) of the craps table—i.e., a longitudinal end furthest away from the player's position. In embodiments, cameras 365*a*, 365*b* (or a single camera similarly positioned, or more than two such similarly positioned cameras) may be configured so as to comprise field of views sufficient for the cameras to capture or monitor information regarding the dealer(s) or attendant(s) that are located, for example, at or around area 315, and/or to capture or monitor one or more players at respective player stations 115 or other people positioned at or near the player stations 115 or dealer area 315.

As would similarly be appreciated, in one example, a player located at a position of the player station 115 utilizing the touch display 250 located at the right most end of the craps table 300 illustrated in FIG. 4 would be required to throw dice from their position at that player station towards the longitudinal end opposite from that position. In this example, the player would be required to throw dice from their position at the player station 115 towards the end 312 of the play field so that the dice will hit against bumper wall 515*a*. The one or more camera in this example, e.g., camera 365*a* may be configured to comprise a field of view 382 (See, FIG. 5A) to capture, for example, information related to the throw of the dice, the outcome or results of the throw of the dice.

Figure 5B:
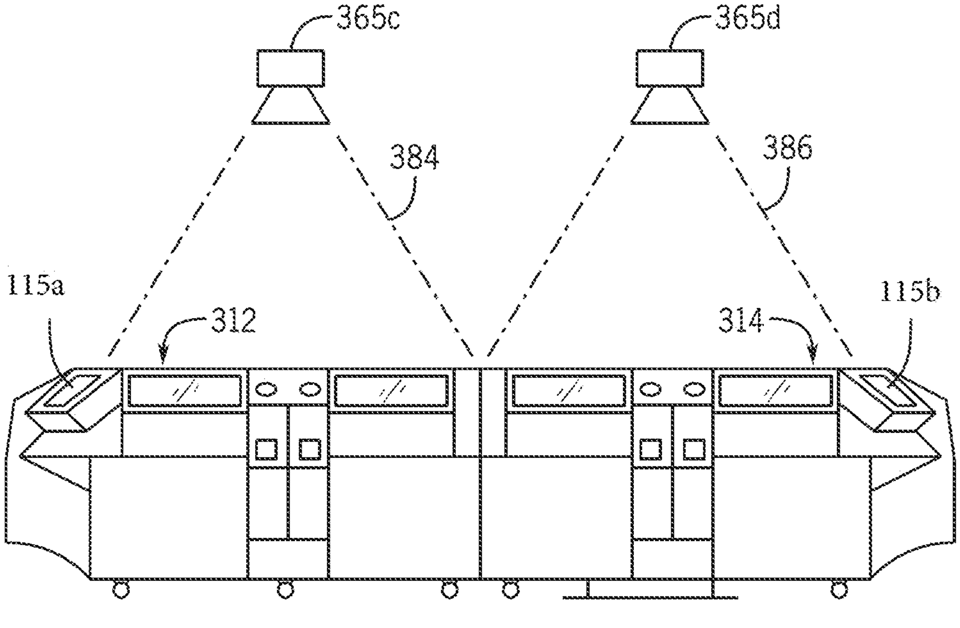
FIG. 5B is a side view of a craps table showing example cameras having fields of view, according to embodiments of the craps systems of the present disclosure.

In embodiments, the at least one camera 365 may alternatively or additionally comprise one or more cameras that are positioned or mounted at an elevation above the craps table 300 such that the field of view of the camera is pointed generally downwardly or vertically downwardly onto the craps table or the play field of the craps table, e.g., cameras 365*c*, 365*d* illustrated in FIG. 4. The one or more cameras pointed generally downwardly onto the craps table may comprise a single camera or more than two cameras in various embodiments. Cameras 365*c*, 365*d* illustrated in FIG. 4 may be mounted on one or more poles or mounts 375*a*, 375*b* that extend upwardly from the craps table and which may be configured so that the cameras 365*c*, 365*d* point in a direction generally vertically downwardly onto the craps table or the play field of the craps table and comprise fields of view 384, 386, respectively (See, FIG. 5B). In embodiments, camera 365*c* may be configured to comprise a field of view 384 that encompasses at least a half portion of the craps table 300, such as at least a first longitudinal half portion of the craps table. Camera 365*d* may be configured to comprise a field of view 386 that encompasses at least another portion of the craps table 300, such as at least a second longitudinal half portion of the craps table. As would be appreciated, in one example, a player located at a position of the player station 115 utilizing the touch display 250 that is located at the left most end illustrated in FIG. 4 would be required to throw dice from their position at that player station towards the longitudinal end opposite from that position. In this example, the player would be required to throw dice from their position at player station 115*a* (FIG. 5B) towards the end 314 of the play field so that the dice will hit against bumper wall 515*b*. The camera 365*d* in this example would be configured to comprise a field of view 386 to capture information related to the throw of the dice or the outcome or results of the throw of the dice.

As would similarly be appreciated, in one example, a player located at a position of the player station 115 utilizing the touch display 250 located at the right most end of the craps table illustrated in FIG. 4 would be required to throw dice from their position at that player station 115 towards the longitudinal end opposite from that position. In this example, the player would be required to throw dice from their position at the player station 115*b* (FIG. 5B) towards the end 312 of the play field so that the dice will hit against bumper wall 515*a*. In this example, the camera may be configured to comprise a field of view 384 to capture, for example, information related to the throw of the dice or the outcome or results of the throw of the dice. In embodiments, cameras 365*c*, 365*d* (or a single similarly positioned camera or more than two such cameras) may be further configured so as to comprise fields of view to capture or monitor information regarding the dealer(s) or attendant(s), which may be located, for example, at or around area 315, and/or to capture or monitor information regarding one or more players at respective player stations 115 or other people positioned at or near player stations 115 or the area 315 for the dealers. It should be appreciated that one or more of the cameras in FIG. 4, e.g., cameras 365*c*, 365*d*, may also be configured to determine the number of dice on the play field so as to determine, for example, whether to progress with a next game state of the craps game as discussed herein.

Dice Tracking

In embodiments, the craps systems or craps tables of the present disclosure may be configured to (e.g., the dealer station 120 may be configured to) analyze information or image(s) from the at least one camera 365 (e.g., one or more of the cameras 365*a-f* illustrated in the example craps tables of FIG. 4 or FIGS. 11-13B) related to the throw of the dice. The craps system may analyze such information or image(s) from the time the dice are initially released by a player until the time the dice come to rest on the play field of the craps table (or other play field). The dice or craps system may be configured to analyze such information or image(s) for multiple throws of a craps game and for multiple craps games. Thus, the craps system (e.g., the dealer station 120) may be configured to determine, based upon the information or image(s) received from the at least one camera 365, whether the thrown of the dice complies with one or more requirements for a proper throw of dice for a play of a craps game, as described herein.

The one or more requirements for a proper throw of dice for a play of a craps game may comprise any requirements governing whether the throw of the dice is a fair, valid or proper throw. Such requirements may comprise, for example, a requirement that the dice hit one of the bumper walls or gator walls before coming to rest on the play field. For example, a player located at or near one longitudinal end of the craps table (e.g., a player located at a player station 115 positioned near one longitudinal end 312 or 314 of the play field of craps table 300 illustrated in FIG. 4) may be required to throw the dice from that end all the way to the opposite longitudinal end such that the dice hit the bumper wall or gator wall located at that opposite end. In this example, if the player throws the dice onto the play field towards the bumper wall located at the opposite end of the craps table without the dice actually hitting that bumper wall, the throw of the dice may be considered invalid or improper. Thus, the craps system (e.g., the dealer station 120) may be configured to receive information or image(s) from the at least one camera 365 related to that throw of the dice and, based upon that information or those image(s), determine that the dice did not hit one of the bumper walls before the dice came to rest and thus the throw of the dice did not comply with the requirement(s) for a proper throw of dice.

In further examples, the one or more requirements for a proper throw of dice may comprise a requirement that the dice hit a correct one of the bumper walls or gator walls before coming to rest on the play field. For example, a player located near a center of a craps table (e.g., a player located at a player station 115 located near a center of the craps table 300 illustrated in FIG. 4 or table 400 illustrated in FIGS. 11-13B) may be required to throw the dice from that position against the bumper wall or gator wall that is located furthest from that position. Because the player is positioned near the center of the craps table, the player may not throw the dice towards the bumper wall positioned closest to the player (either mistakenly or intentionally) and instead must throw the dice towards the other bumper wall. In that event, or in any other situation where a player does not throw the dice against a correct one of the bumper walls, the throw of the dice may be considered invalid or improper. Thus, the craps system (e.g., the dealer station 120) may be configured to receive information or image(s) from the at least one camera 365 related to that throw of the dice and, based upon that information or those image(s), determine that the dice did not hit a correct one of the bumper walls or gator walls and thus the throw of the dice did not comply with the requirement(s) for a proper throw of dice.

In other examples, the one or more requirements for a proper throw of dice may comprise a requirement that the dice come to a rest or stop on the play field. For example, if a player throws the dice such that one or more of the dice do not come to rest on the play field, e.g., one or more of the dice bounce off the craps table and land outside of the play field such as on the floor, the throw of the dice may be considered invalid or improper. Thus, the craps system (e.g., the dealer station 120) may be configured to receive information or image(s) from the at least one camera 365 related to that throw of the dice and, based upon that information or those image(s), determine that one or more of the dice did not stop on the at least one play field and therefore did not comply with the requirement(s) for a proper throw of dice.

In further examples, the one or more requirements for a proper throw of dice may comprise a requirement that the dice tumble before coming to rest or stopping on the play field or a requirement that the dice tumble greater than a certain number of times before stopping or coming to rest on the play field. For example, a player may throw the dice in such a manner that the dice merely slide on the play field surface (rather than tumble) or tumble less than some predefined or predetermined number of times (e.g., tumble a few times on the play field but mostly slide). In such instances, the throw of the dice may be considered invalid or improper. Thus, the craps system (e.g., the dealer station 120) may be configured to receive information or image(s) from the at least one camera 365 related to that throw of the dice and, based upon that information or those image(s), determine that the dice did not tumble at all (or tumbled less than a predetermined number of times) and therefore the throw of the physical dice did not comply with the requirement(s) for a proper throw of dice.

In embodiments, the craps system or craps tables of the present disclosure may be configured to (e.g., the dealer station 120 may be configured to) notify the attendant(s) or dealer(s) whether the throw of the dice complied with the one or more requirements for a proper throw of dice, and configured to allow the attendant(s) or dealer(s) to determine whether to continue to proceed with the play of the craps game. For example, the craps system may be configured to (e.g., the dealer station 120 may be configured to) determine that a throw of the dice did not comply with one or more requirements for a proper throw of the dice and notify the dealer(s) or attendant(s) of the improper throw determination. In response to the improper throw notification, the craps system may be configured such that the dealer(s) or attendant(s) then require the player/shooter that threw the dice (or a different player) to re-shoot or re-throw the dice. For example, the craps system may be configured to require the dealer(s) or attendant(s) to provide an input into the craps system, which input triggers a re-shoot of the dice. In other examples, the craps system may be configured to (e.g., the dealer station 120 may be configured to) determine that the throw of the dice complied with the one or more requirements for a proper throw of dice, and notify the dealer of the proper throw. In response to the proper throw notification, the craps system may be configured to require the dealer(s) or attendant(s) to confirm that the throw of the dice was indeed proper, and to provide an input into the craps system to allow the play of the craps game to continue or progress, e.g., to allow the game to pay any winning wagers based upon the results or outcome of the throw of the dice and wagers placed for the play of the craps game.

In various examples, the craps system or craps table of the present disclosure may be configured to (e.g., the dealer station 120 may be configured to) notify the dealer(s) or attendant(s) of whether the throw of the dice complied with one or more requirements for a proper throw of dice by displaying on one or more display device an indication of whether the throw of the dice was proper, e.g., displaying the indication on the display device 180 of dealer station 120. In other examples, the notification of whether the throw of the dice was proper may be by any other suitable indications, e.g., an audio indication at dealer station 120, an audio/video indication at dealer station 120 and/or a video indication at dealer station 120. The video indication may be a video recording in various embodiments, which recording may be reviewed by dealer(s) at, for example, the dealer station display device 180. In further examples, the craps system or craps table may be configured to (e.g., the dealer station 120 may be configured to) request an input from dealer(s), for example, at dealer station 120, upon receiving such indication of whether the throw of the dice complied with the one or more requirements for a proper throw of dice. For example, the craps system or craps table may be configured such that (e.g., the dealer station may be configured such that), the dealer provides an input at the dealer station 120 (e.g., via touch display 185 of dealer station 120) to confirm that the play of the craps game can progress (e.g., if the indication is that the throw complied with the one or more requirements), or the dealer provides an input that disallows the progress of the play of the craps game (e.g., if the indication is that the throw did not comply with the one or more requirements). Thus, the craps system or craps table may be configured to (e.g., the dealer station may be configured to), based upon the determination of whether the throw of the dice complies with the one or more requirements for a proper throw of dice and based upon an input received from the at least one dealer station, determine whether to proceed with the play of the craps game.

Figure 6A:
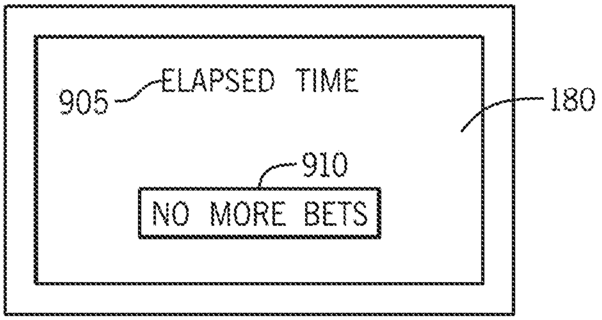
FIGS. 6A-6C are screen shots of a dealer station display device, according to embodiments of the craps systems of the present disclosure.
Figure 6B:
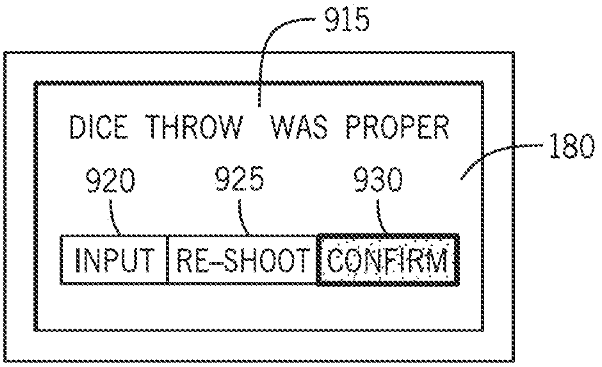
Figure 6C:
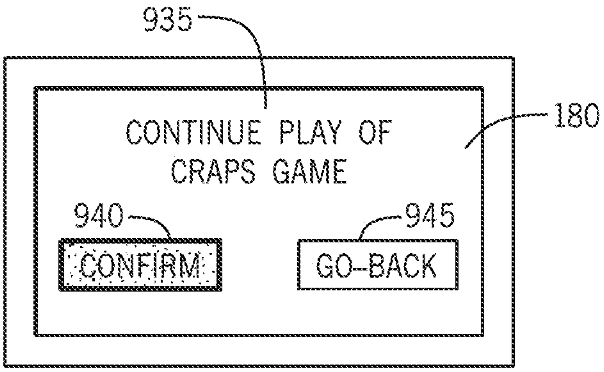

Turning now to FIGS. 6A-6C, these figures illustrate examples of at least a portion of a video display or display device 180 for a dealer station 120 according to embodiments of the craps systems or craps tables of the present disclosure in which the craps systems disallow any further bets. As illustrated in FIG. 6A, the dealer station display device 180 indicates or displays that the time for placing any more bets by the player(s) has elapsed via an "Elapsed Time" message 905, and that the dealer or attendant has pressed the "No More Bets" input button 910 at the dealer station 120, which disallows any further bets from being placed by player(s) of the craps game. At this time, the dealer may then pass the dice to a shooter/player so that the shooter may throw the dice onto the play field for the play of the craps game. In embodiments, the craps system may automatically disallow any further bets, for example, after a certain amount of time has elapsed. In other embodiments, the craps system may require input from the dealer(s) or attendant(s) to disallow any more bets by, for example, requiring the dealer(s) or attendant(s) to provide an input at the dealer station 120, such as pressing the touch display of the dealer station display device 180 illustrated in FIG. 6A.

FIG. 6B illustrates embodiments of the dealer station display device 180 (of a dealer station 120) after a shooter has thrown the dice for a play of the craps game and the craps system has determined that the throw of the dice complies with one or more requirements for a proper throw of the dice. In particular, FIG. 6B illustrates the dealer station display device 180 showing a "DICE THROW WAS PROPER" message 915. The determination that the throw of the dice was proper may be based upon information or image(s) received from the one or more of the cameras 365, as discussed herein. FIG. 6B also illustrates three buttons displayed on dealer station display device 180—an "INPUT" button 920, a "RE-SHOOT" button 925, and a "CONFIRM" button 930. In embodiments, the "INPUT" button 920 may be used where a discrepancy exists between the determination by the craps system as to whether the throw of the dice was proper and a judgement by the dealer(s) or attendant(s) as to whether the throw of the dice was proper. For example, the "INPUT" button 920 may be used by a dealer(s) where the dealer(s) judge or believe that the craps system determination was improper—e.g., the dealer(s) witnessing something different during the throw of the dice from the determination by the craps system, or the dealer(s) reviewing recorded video from the at least one camera 365 and seeing something different from the determination by the craps system. In examples, if the message at the dealer station display device 180 indicates that the throw of the dice is proper, but the dealer(s) believe or judge the throw to instead be improper, the dealer(s) may press the "INPUT" button 920 and provide information into the craps system regarding this discrepancy. After providing such input, the dealer(s) may, for example, require the shooter to re-shoot or re-throw the dice, or the dealer(s) may determine that the play of the craps game should be discontinued. The "RE-SHOOT" button 925 may be used, for example, when the craps system determines that the throw of the physical dice was improper, and the dealer(s) thus select to require the shooter to re-shoot or re-throw the dice. The "CONFIRM" button 930 may be used by the dealer(s) to confirm that the dealer(s) agree with the determination by the craps system that the throw of the dice was a proper throw and the dealer(s) believe the play of the craps game should continue or progress. In FIG. 6B, the "CONFIRM" button 930 is illustrated as shaded or highlighted because the dealer(s) have pressed the "CONFIRM" button confirming that the dealer(s) believe the throw of the dice was a proper throw and that the play of the craps game should progress or continue.

FIG. 6C illustrates, after the dealer(s) having pressed the "CONFIRM" button 930 in FIG. 6B, that the craps system asks the dealer(s) to confirm that the play of the craps game should indeed continue. In particular, FIG. 6C illustrates the dealer(s) confirming that the craps game should continue (i.e., affirming the dealer(s) previous confirmation made at FIG. 6B) by pressing another "CONFIRM" button 940 on the new screen illustrated FIG. 6C. If the dealer(s) believe a mistake was made in the confirmation at FIG. 6B or the dealer(s) have changed their decision from the previous screen for whatever reason, the dealer(s) may press the "GO-BACK" button 945 to revert to the previous display of FIG. 6B. The pressing of the "CONFIRM" button 940 in FIG. 6C is illustrated via the shading of button 940 and the dealer station display device 180 accordingly displaying the "CONTINUE PLAY OF THE CRAPS GAME" message 935.

Figure 7:
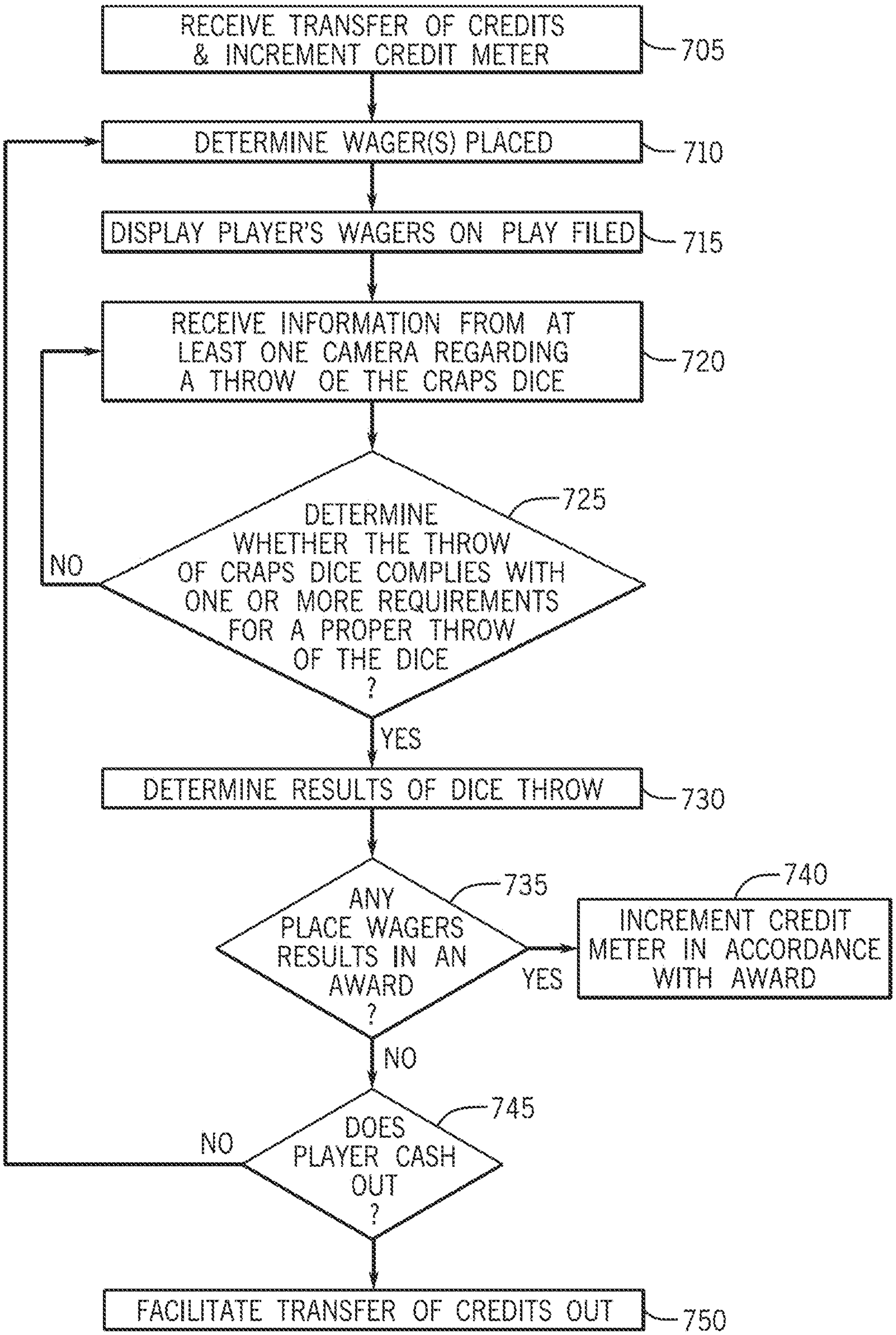
FIG. 7 is a flowchart illustrating a craps table operation, according to embodiments of the craps systems of the present disclosure.

FIG. 7 illustrates an example process for operating craps systems or craps tables according to embodiments of the present disclosure. In this process, the craps system is a hybrid craps table. However, it should again be appreciated that a similar process may be performed by a traditional craps table. In embodiments, the process may be implemented by software executed by at least one processor, for example, the dealer station processor or any other suitable processors in communication with the dealer station processor. In various embodiments, the game control processor may carry out the process, and the game control processor may be in communication with the dealer station processor. In the illustrated process of FIG. 7, the craps system may begin by receiving a transfer of credits and incrementing a credit meter at step 705. In embodiments, the craps system may be configured to enable a player to transfer credits directly to their player station by inserting cash or a ticket representing a monetary value into a printer/bill acceptor, as discussed above. In examples, a ticket from a slot machine cash-out event can be used to transfer credits onto the player station of the hybrid craps table. It is also contemplated that an attendant at the table can facilitate the transfer of credits, for example, from the dealer station. It is also contemplated that the player can insert a player tracking card to facilitate the transfer of credits. It is further contemplated that the player may use a small electronic device, such as a smartphone or tablet, to facilitate the transfer of credits. In embodiments, the credit meter may be a numeric number which represents the amount of credits that are available to the player to wager. In other embodiments, the credit meter is associated with a visual display which represents the virtual chips the player has, and is able to wager. In this manner, an element of a traditional craps game may be closely replicated in that the player can see and easily verify their accumulation of chips. In still further embodiments, the player station is configured to display the virtual chip information so that other players can easily view this information as well.

Next, the craps system determines the wager(s) placed at step 710. In embodiments, the player station determines from the inputs received where the player had indicated to place bets. In other embodiments, the player station prompts the player to confirm the desired bets before officially finally placing the bets. In another embodiment, the player station provides a notification, for example a countdown timer, to alert the player as to when bets are no longer accepted. It is contemplated that a player can make a plurality of wagers on a plurality of different outcomes of the next dice roll.

At step 715, the craps system displays the player's wager on the play field. In embodiments, each player has a unique appearance to their player chips that are represented on the play field. In another embodiment, players have the ability to customize the look of their virtual player chips, perhaps for a fee, or based on a player tracking status, or by trading in non-cashable credits awarded by a casino. In embodiments, when it is determined that no further bets will be accepted, for example by a betting clock expiring, the attendant will pass the dice to the shooter or player that will be throwing the dice for the play of the craps game.

At step 720, the craps system receives information from the at least one camera regarding the throw of the physical device. As discussed above, in embodiments, the information or images received from the at least one camera may be from a single camera, which may be in various examples one of the cameras 365*c*, 365*d* illustrated in FIG. 4, which are elevated and mounted so as to generally point downwardly onto the play field of the craps table. In other examples, the single camera may be one of the cameras 365*a*, 365*b* illustrated in FIG. 4 that are positioned at a height slightly above the top of the play field so that the cameras point at an angle close to horizontal or parallel with a top surface of the play field. In examples, the single camera may be a camera having a field of view that points generally towards the longitudinal end of the craps table to which the player should be throwing the dice so that the dice hit one of the bumper or gator walls furthest away from the player. In other embodiments, the information or image(s) received from the at least one camera may be from a plurality of the cameras, e.g., both of the cameras 365*a*-365*b* in FIG. 4, both of the cameras 365*c*, 365*d* in FIG. 4 or any combination of cameras 365*a*-365*d* in FIG. 4. In other examples, as discussed above, the craps table or craps system may comprise more than four cameras and the information received regarding the throw of the dice may be from one or more of the more than four cameras.

At step 725, the craps system determines, based upon the information received from the at least one camera, whether the throw of dice by the shooter/player complies with one on or more requirements for a proper throw of dice. The one or more requirements used by the craps system to determine whether the throw of the dice complies is a proper throw may be any of the requirements discussed herein. If the craps system determines the throw of the dice does not comply with one or more requirements for a proper throw of dice, or otherwise is unable to determine compliance, the dealer station may notify the dealer of same at the dealer station (e.g., by displaying on the dealer station display device) and the dealer may request that the shooter re-throw the dice. Thus, the craps system is configured to again receive information from the at least one camera regarding the throw of the dice for a play of the game (i.e., the re-throw). If the craps system determines the throw of the dice complies with one or more requirements for a proper throw of the physical dice, the craps system and/or the dealer(s) then determine the results or outcome of the throw of the dice at step 730. In embodiments, the craps system may be configured determine the results or outcome of the dice throw based upon information or image(s) received from the at least one camera 365, as discussed herein.

In embodiments, an attendant can both manage the table and act as the dice stickman. To determine the results of the roll, the attendant may input the results of the dice throw into the dealer station in examples. In other examples, the dealer station will have an input device or simplified graphical user interface (GUI) to accelerate the input of the results while also minimizing the chance for inputting the incorrect results. For example, the GUI may comprise two sections which each show six virtual representation which represent each possible dice roll for a single dice. In such an example, the attendant would then just have to select a virtual dice from each section which matches the actual dice roll.

In additional embodiments, the craps tables or craps systems herein may be configured such that the dealer station 120 (e.g., the dealer station display device 180) may prompt the attendant to confirm the results of the throw of the dice prior to finalizing the result. In additional embodiments, the craps systems herein use image(s) or information received from at least one camera 365 (e.g., at least one of cameras 365*a*-365*d*) to determine the results or outcome of the dice throw as discussed herein. In embodiments, the at least one camera 365 herein may comprise specialized cameras and specialized software. In other embodiments, the results of the dice throw may be determined by an automated dice recognition system that may comprise, for example, communication circuitry within the dice, which are configured to communicate with a complimentary electronic system located in close proximity to the play field. The communication can be by way of, for example, WiFi, Bluetooth, NFC, RFID, accelerometers, or other similar manners. In such embodiments, it is contemplated that the results of the dice throw are automatically tracked and communicated to the system.

In examples, an automated dice recognition system may utilize RFID and RFID tags may be embedded on each face of the dice utilized in the play of a game. In further examples, one or more RFID readers are located near the play field, and are configured to flow current to an associated antenna or antennas based on instructions received from an associated or processor, which causes the transmittal of a predetermined command to the RFID tags. In one example, such antennas are loop-shaped. Then, a magnetic field is altered within the area surrounded by the antenna or antennas in which the current flowed. Along with the alteration of magnetic flux in this magnetic field, electromotive force is generated within the antenna that is included in the RFID tag which is disposed within the area. Herewith, electric power is transmitted to the RFID tag, whereby communication with the RFID tag is performed.

In further embodiments, several antennas are associated with each RFID reader. In one example, each such antenna is positioned so that at least a portion of each of the detection areas are overlapping. In yet additional embodiments, dice having RFID tags also comprise one or more accelerometers. In one example of such an embodiment, the accelerometers are configured to communicate with the dice recognition system when the associated dice does not land fairly on the play surface, for example, when a dice lands resting at an angle against a bumper wall.

In still other embodiments, an automated dice recognition system may be located only at one end of the craps table, and would require that all throws occur from the opposite end of the craps table. In other embodiments, one or more automated dice recognition systems may be positioned to detect dice at both ends of the craps table.

At step 735, the craps system compares the determined results of the dice throw with the wagers placed by player(s), to determine if any wager results in an award. It should be understood that in the game of craps, any single dice throw may not result in the resolution of each wager placed or were pending on that dice throw. However, after each dice throw, the system must determine if any particular wager results in an award. If there is a determination that a wager results in an award, the credit meter is incremented in accordance with the award at step 740.

At step 745, the craps system is configured such that, if the player station receives an input from the player indicating a cash-out, the player station may then facilitate the transfer of credits out at step 750. In embodiments, such a transfer might be by way of a printed ticket, from the printer/bill acceptor peripheral, which represents the amount of credits the player is cashing out. In other embodiments, the transfer might be by way of electronic transfer to an account the player has access to. For example, the transfer might be to the player's smartphone or table, player's account managed by the casino, or bank account.

If the player does not cash out at step 745, the craps system may return to step 710 and again determine if the player places any additional wagers. As discussed above, it may take several rolls of the dice before the player's initial wagers are resolved, so it is contemplated that a player may remain actively playing on the hybrid craps table without having to place a new wager for every roll of the dice.

Dice Counting

In further embodiments, the craps systems or craps tables of the present disclosure may be configured to (e.g., the dealer station 120 may be configured to), based upon information or image(s) received from the at least one camera 365, determine a number of dice on the play field and cause the craps system to proceed with a next stage or next game state of the craps game. For example, the craps system may be configured to, based upon information or image(s) received from the least one camera, determine that the number of dice on the play field is five. Based upon the determination that the number of dice on the play field is five, the craps system may be configured to progress to a next game state, e.g., progress to a player dice selection state, where the dealer may provide the five dice to a player/shooter for the player to select which of the five dice to thrown onto the play field for the play of the craps game. In another example, the craps system may be configured to, based upon information received from the at least one camera 365, determine that there are two dice on the play field. Based upon the determination that there are two dice on the play field, the craps system may be configured to progress to a next game state of the craps game, e.g., progress to a dice shoot state where the player can throw the dice onto the play field for the play of the craps game. In yet another example, the craps system may be configured to, based upon information received from the at least one camera 365, determine that there are zero or no dice on the play field. Based upon the determination that there are zero dice on the play field, the craps system may be configured to progress to a next game state of the craps game, e.g., progress from a bet state of the craps game to a dice shoot state of the craps game.

In various embodiments, the craps systems herein may be further configured to require the attendant(s) or dealer(s) to confirm the determination by the craps system of the number of dice on the play field is valid or correct prior to progressing to the next game state, or to confirm that the dealer(s) want to progress to the next game state regardless of whether the determination by the craps system as to the number of dice on the play field is correct. In various examples, the craps system may be configured to request such a confirmation by displaying the results of the determination of the number of dice on the play field on the display device at the dealer station, and requesting input from the dealer(s) at the dealer station (e.g., by requesting the dealer(s) press a confirm button on the dealer station display device to confirm that the craps game should progress to the next game state or by pressing a reject button and disallowing the craps game to progress to the next game state). In other embodiments, the craps system may be configured to determine the number of dice on the play field, and based upon the determination of the number of dice on the play field, automatically cause the craps system to progress to the next game state.

In various examples of the craps tables or craps systems herein, including craps system that may be configured to determine a number of dice based at least in part upon the scene or state of the game, the number will be judged. In examples, the craps system determines there are five dice in a home area during betting and determines during game play, the craps system determines the trajectory of the dice and that two dice have been thrown. By sharing and communication information regarding the determination on the number of dice such as communicating such number with the game side, the craps system may be configured to use the determination of the number of dice as a basis for determining the progress of the game and whether to progress the game. By making these judgments, the craps system may also be configured to help prevent cheating by informing a dealer or attendant of cheating, such as when betting may have occurred after the dice have been thrown, and by enabling the dealer to confirm crap dice outcomes.

Dice Outcome

In still further embodiments, the craps system or craps tables of the present disclosure may be configured to (e.g., the at least one dealer station processor may be configured to) determine the outcome or results of the dice thrown onto the play field based upon information received from the at least one camera 365 relating to the dice after the dice have come to rest or stopped on the play field. For example, the craps system may be configured to determine, after the dice have stopped on the surface of the play field, how many dots are displayed on each of the dice at rest on the play field and thus the outcome or results of the dice throw. In various examples, the craps system may use an artificial intelligence ("AI") based image analysis system and method to analyze the information or image(s) received from the at least one camera 365 to determine the outcome of the dice throw. In one example, such AI based image analysis may comprise determining a difference between color(s) of dots on the dice and color(s) on the rest of the dice, to determine the outcome of the dice throw, for example the analysis may comprise distinguishing between white dots on the dice and an overall red dice to determine the outcome of the dice throw). The AI based system in various embodiments may be configured to learn from image data of dice outcomes and improve upon the level of reading and determining results of the dice throws.

In various examples, the craps system may be configured to automatically determine and automatically enter the outcome or results of the dice throw, and thus allow the craps game to automatically progress to a next game state such determining any awards based upon the wagers placed. In other examples, the craps system may be configured such that the dealer station display device displays the determination of the results of the dice throw and requests that the dealer(s) confirm whether the determination by the craps system is correct or valid. For example, the craps system may be configured to display on the dealer station display device 180 the determined outcome of the dice throw (e.g., one dice shows one dot, the other dice shows four dots), and cause the dealer station display device 180 to request that the dealer(s) provide an input into the dealer station to either confirm or rejection the determination based upon the dealer(s)'s view or judgement of the outcome of the dice at rest on the play field.

Image(s) of Shooter and Dealer

In further embodiments, the craps systems or craps tables of the present disclosure may be configured to (e.g., the dealer station 120 may be configured to) receive or capture information or image(s) from the at least one camera 365 related to the player/shooter throwing the dice and/or related to the dealer(s) or attendant(s) at the craps table. The craps system may also be configured to receive or capture information or image(s) related to the area(s) surrounding the player/shooter and the dealer(s) or attendant(s), as well information or image(s) related to other players and the area(s) surrounding the other players. In various examples, the craps system may be configured to capture or receive such information or image(s) such that the image(s) are displayed in real time or recorded for a video replay of the image(s). The craps system may be configured to play such image(s) (e.g., video images recorded and replayed or displayed in real time) on one or more of the display devices associated with the craps system or craps tables herein (e.g., on the dealer station display device and/or the player station display device(s), or any other display device(s) associated with the craps systems or tables herein). By playing such video in real time or played back, the craps systems of the present disclosure can make players and dealers alike aware that they are being watched, thereby reducing the possibility of cheating. It should be appreciated that the capturing of the image(s) surrounding the dealer(s) or attendant(s) may also assist with determining whether any tampering is occurring or has occurred with the dealer station itself. It should be appreciated that in various embodiments, the at least one camera 365 configured to capture information or image(s) related to the dealer(s) and player(s) may be the example cameras 365*a*, 365*b*. In other embodiments, any other cameras suitably mounted and/or configured for capturing such images may be utilized.

Examples of Dice Tracking, Dice Counting, Dice Outcomes and/or Dealer/Shooter Imaging In examples of the present disclosure, including the craps systems configured to determine whether a dice throw complies with one or more requirements for a proper dice throw, the craps systems may comprise one or more cameras having 4000×3000 resolution. A throw of the dice in such examples may be from a right wall to a left wall of the craps table and the left end of an X axis may be 0 pixels and the right end may be 4000 pixels. The craps systems in examples may be configured to, using machine learning, for example, determine or draw a trajectory from the coordinates of the dice movement, and determine or obtain the difference between the minimum X-axis coordinate and the maximum X-axis coordinate after the minimum X-axis coordinate. The craps systems may be configured to determine or calculate this difference as the amount of movement of the wall reflection. In examples, if there is no calculated difference in the X-axis direction, the craps systems may be configured to determine the difference in the Y-axis direction from the time when the X-axis minimum coordinate is reached. The craps systems may be configured to determine or calculate the amount of movement and used that determination as a basis for judging wall reflection. In other examples, when dice are thrown from the left wall to the right wall, the craps system may be configured to use the same or similar algorithm to determine or calculate the difference between the X-axis maximum coordinate and the X-axis minimum coordinate after the X-axis maximum coordinate as the amount of movement of the wall reflection.

In further examples of the present disclosure, including the craps systems configured to determine whether a dice throw complies with one or more requirements for a proper dice throw, the craps systems may be configured to determine thrown dice slid when the dice are thrown in such a way that the dice slide and a result does not change. The craps systems may be configured to, using, for example, machine learning, determine if the same number continues in a row or consistently, determine that the throw of the dice does not comply with one or more requirements for a proper throw of the dice or determine the throw of the dice is a false throw or false outcome such as a determination that the dice slid rather than tumbled. In examples, the craps systems may be configured to determine such throws are improper or the results are improper by thinning out parts of the image(s) that cannot be judged well when the image is blurred.

In yet further examples of the present disclosure, including the craps systems configured to determine whether a dice throw complies with one or more requirements for a proper dice throw, the craps systems may be configured to specify or set a range in which the dice roll. For example, the craps systems may be configured to specify the area for a specific role such as a home area and or a field area, etc., the craps system may be configured to determine at a variety of times when to advance play of the craps game so as to aid in the progress and flow of a craps system or game. By specifying the range, the craps system may also be able to reduce processing load and avoid erroneously determining or recognizing objects outside the field as dice. In addition, by specifying an area with a specific role such as the Home area, Field area, etc., the position of the dice is determined at each timing to advance the game play, and the progress of the game is assisted.

In still further examples of the present disclosure, including the craps systems configured to determine whether a throw of the dice is proper, the number of dice or the outcome of the dice throw, the craps system may be configured to utilize background subtraction. The craps system may comprise, in examples, a camera having a resolution of 4000×3000 and the dice may have approximately 50 pixels (for object detection this may be relatively small) and thus misdetection may result and processing load may increase, particular, for example, when using machine learning. The craps systems herein therefore may be configured to use a background subtraction method to extract a difference with the background and identify the position of dice and to then detect the dice and determine the dice result, such as the number of the dice, whether the dice throw was proper, or the outcome of the dice throw, using, for example, machine learning. The craps system may be configured to achieve high speed by excluding large objects and judging objects about the size of the dice and applying them to the detector. It should be appreciated that by learning various types of dice through machine learning for example, the ability to accurately determine dice outcomes, number of dice and whether throw of the dice was proper may be improved by the craps tables and craps systems herein.

In yet further examples of the present disclosure, including craps systems configured to determine the number of dice, the dice utilized may have colors that are easy to detect, so that background color of the play field may be a changeable LED panel. In certain examples, the craps system may utilize a background color for general purposes, but depending on the type or color of dice used, the craps system may have difficulty judging the dice. Thus, it should be appreciated that various examples of the craps systems or craps tables herein, a background color may be selected that is an easy-to-detect background for the craps system. In examples, the one or more cameras of the craps tables or craps systems herein may comprise a camera with a fast shutter speed to make it easier to follow a trajectory of dice when the dice are thrown. In examples, the play field may display to brightly and interfere with the one or more camera(s) ability to recognize dice. Thus, the craps systems herein may be configured to allow the display of the craps system to be changed to a dimmer display, such as a blue backlighting. In certain examples, moiré may occur when a camera resolution and a play field light match (e.g., LED panel match), so it is contemplated that in examples of the craps systems herein, one or more of the cameras may be selected with a resolution optimized to prevent moiré.

Figure 8:
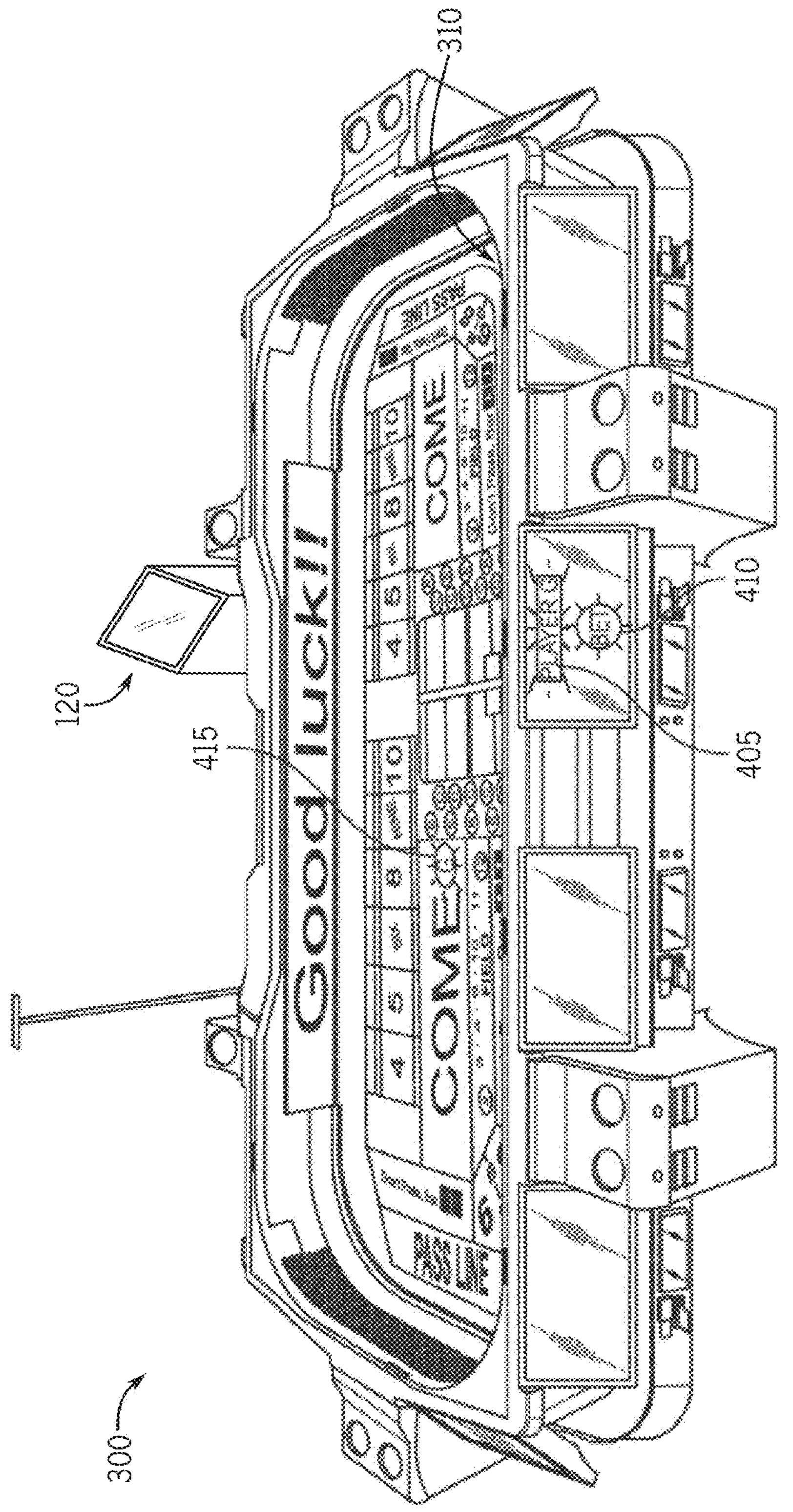
FIG. 8 is a perspective view of a craps table illustrating an example betting operation, according to embodiments of the craps systems of the present disclosure.

FIG. 8 illustrates a craps table 300 in accordance with embodiments of the craps system of the present disclosure in which the configuration of the table 300 may initially appear to a player as being similar to a typical craps table with wagering areas and the play field as a whole. However, as with FIG. 4, FIG. 8 illustrates embodiments of a hybrid craps table in which a player utilizes a touch display to input the decision to bet, shown generally at 410. It is understood that there are several bets available to a player in craps, and a player can bet on multiple propositions offered throughout the game of craps. In one embodiment, the screen can provide a virtual representation of the craps field, and a player can make wagers by selecting the appropriate parts of the game field for their wagers. FIG. 8 provides a basic illustration of how a player may make a simple bet, and is simplified only to more easily illustrate how the hybrid craps embodiments operate, and should not be understood as limiting the present disclosure to only such simplified betting mechanisms.

Continuing with the illustrated example, the player has been identified as "PLAYER G" at 405. In embodiments, a player is identified by personal information derived from the player tracking device or system, such as their name or nickname or avatar. In another embodiment, the player is identified by the particular player station they are playing from, for example as "PLAYER 5" if they are playing on a player station designated as number 5. As the player confirmed the bet by pressing the bet button 410, the play field illustrates the player bet with a virtual gaming chip 415. In various embodiments, virtual gaming chip 415 is visually associated with the player station or the player that made the wager. In the illustrated example, virtual gaming chip 415 is illustrated with a "G", which is associated with PLAYER G 405. In other embodiments, each player station is associated with a distinct color, and the virtual gaming chips 415 are displayed in the color of the player station that the wager is associated with. In other embodiments, virtual gaming chips 415 may be personalized based on personal information derived from the player tracking device or system. In further embodiments, player stations are configured so that their identifying characteristics are easily viewable from other player stations. For example, if each player station is associated with a specific color, the player stations may have their associated color displayed on or near their touch display 250, and so when other players view wagers being displayed on the play field, they can more easily discern which player station, and therefore which player, is associated with that wager. These embodiments may facilitate one player copying the wagers of another player that they perceive is lucky or otherwise is a better player. It is contemplated that by visually associating virtual gaming chip 415 with the player or player station that made the wager, it makes tracking player wagers easier for the player, as they are more easily able to quickly identify where all of their wagers are.

In additional embodiments, play history of individual players are viewable by other players. In one example, a first player can access the last number of rolls of a second player through their touch display 250. In other examples, the field display device(s) and/or bumper display device(s) (discussed in more detail below) display historical shooting data from the player that is currently throwing the dice. In additional examples, a separate display or displays are associated with hybrid craps table 300 to provide viewing of such information. In one embodiment, the historical shooting information is obtained from the game control CPU 105 in coordination with player tracking 225. For example, game control CPU 105 may provide for the logging of historical rolls, as automatically detected or as inputted by a game attendant, and facilitates that information's coordination with player identification information that is derived from the player tracking device 225. In another example, player roll history is based on the player station 115 that is rolling, rather than the individual player that is rolling. In another embodiment, an individual player roll history may be utilized for security purposes, for example to help identify statistical anomalies with individual player's rolls. In a further embodiment, a player station roll history may be utilized for security purposes, for example to help identify statistical anomalies with rolls from a particular player station.

Figure 9:
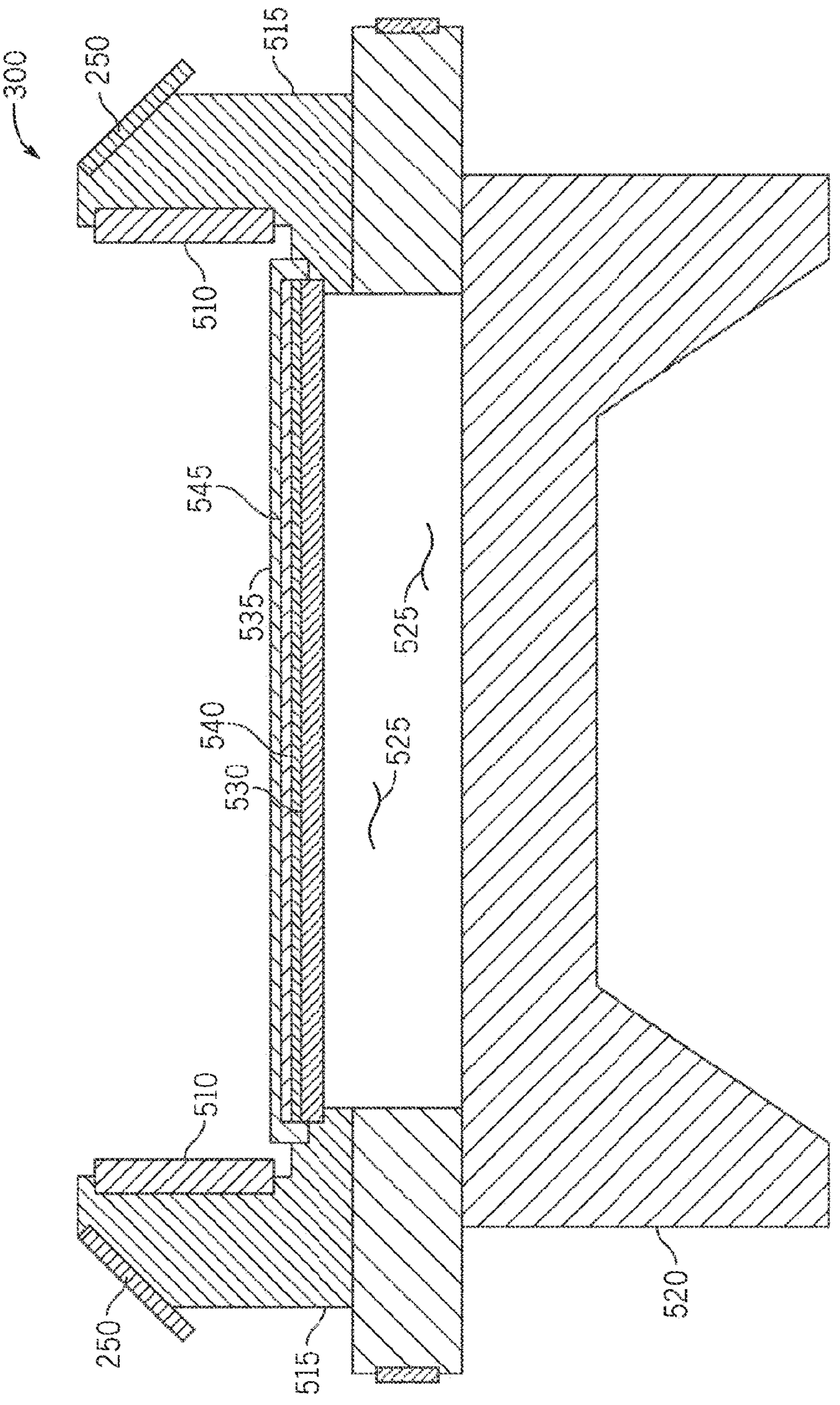
FIG. 9 is a sectional view of a craps table, according to embodiments of the craps systems of the present disclosure.

FIG. 9 is a cross-sectional view of the craps table 300 of FIG. 4 in accordance with embodiments of the craps systems of the present disclosure. As can be appreciated, the craps table 300 may be a hybrid craps table as illustrated that can include aspects of traditional craps tables including a table base 520 and bumper walls 515. Again, it should be appreciated that in various embodiments, that the craps systems of craps tables of the present disclosure may alternatively be traditional craps tables. The craps table 300 of FIG. 9 also illustrates a plurality of player input devices such as touch display 250, which as discussed above, may be associated with player stations. As discussed above, the craps table 300 may also include at least one camera and the dealer station 120, both of which have been omitted from FIG. 9 for ease of reference.

Hybrid craps table 300 may also include a play field display device 530, which is configured to display static images, dynamic images, video images, and/or multimedia. It should be appreciated that while the discussion of the cross-sectional view of the hybrid craps table 300 discusses a field display device 530, the size of the hybrid craps table may necessitate multiple field display devices 530. It is contemplated that field display device 530 can be a flat-panel display, such liquid crystal display (LCD), light emitting diode (LED) display, a Light Emitting Diode (LED) backlit Liquid Crystal Display (LCD), organic light emitting diode (OLED) display, quantum dot light emitting diode (QLED), plasma display, or an LCD pixel matrix. It is also contemplated that other, non-flat-panel display devices can be used, such as cathode ray tube (CRT) or a projection display system such as digital light processing (DLP), LCD projector, liquid crystal on silicon (LCoS) projector, a multi-LCD laser light source projector, or any other digital projector offering good resolution (e.g., 1080p or 4K UHD). It is contemplated that in embodiments using a projection display system, the projector can be place below or above the playing surface. In one embodiment, a projector display is placed above the table, and the table comprises a standard craps table, complete with felt, except that the felt does not include any demarcations for wagering. In another embodiment, a projector display is placed above the table, and the table comprises a standard craps table, complete with felt, and the felt does include standard demarcations for wagering, but the projector is used to project the virtual betting chips, as discussed more below. In still another embodiment, a projector display is placed above the table, and the table comprises a standard craps table, complete with felt, and the projector is utilized for additional player messaging.

In embodiments, field display device 530 is first overlaid by a rigid protective layer 540. In one embodiment, rigid protective layer 540 is comprised of at least one glass sheet. In another embodiment, rigid protective layer 540 is comprised of plexiglass. It is contemplated that rigid protective layer 540 should be comprised of rigid, highly light-transmissive material, such as glass or plexiglass, and be sufficiently rigid to provide protection to field display device 530.

Continuing with this illustrated embodiment, rigid protective layer is overlaid with a flexible protective layer 545. In one embodiment, flexible protective layer 545 is comprised of at least one urethane sheet. In another embodiment, flexible protective layer 545 is comprised of a different elastomer material. In a further embodiment, flexible protective layer 545 is comprised of a plastic material. It is contemplated that flexible protective layer 545 should be comprised of flexible, with moderate to high light-transmissivity, material. In the present embodiment, the rigid protective layer 540 and flexible protective layer 545 assist in protecting field display device 530 from various threats that can damage it, such as thrown dice, spilled drinks, dropped glasses, or other such threats from typical casino environments.

Continuing further with this present example, flexible protective layer 545 is overlaid with play surface 535. It is contemplated that the play surface 535 can be comprised of multiple layers of different materials. In one embodiment, play surface 535 is comprised of a padding layer and a felt layer. As can be appreciated, a padding layer may be beneficial in absorbing some of the actions associated with typical craps games, including the throwing of dice. It can also be appreciated that a felt layer may help in maintaining the typical look and feel of a craps table. However, it is also contemplated that the play surface 535 can be comprised of a single material, or more than two layers of materials. It is also contemplated that play surface 535 can be comprised of clear material, substantially translucent material, or sufficiently translucent material, or a combination thereof. A clear material would allow visibility of the play field display device 530 even if it is not actively displaying anything. A substantially translucent material may somewhat distort the visibility of the play field display device 530 unless it was actively displaying something. A sufficiently translucent material may would significantly distort the visibility of the field display device 530 unless it was actively displaying something. While many textiles are contemplated for use as a play surface 535 in the present embodiment, their primary attributes should be to allow a player to view the static, dynamic, video, or multimedia presentation from the field display device 530, to provide sufficient padding so as to properly facilitate the playing of craps and the associated throwing of dice, and to be sufficiently uniform and level so as to properly facilitate the playing of craps and the associated throwing of dice.

Such textiles might include felt, linen, polyester blends, wool or wool blends, fleece, cotton or cotton blends, polypropylene, Tulle fabric or other natural or synthetic or blended textile materials. It is further contemplated that such textiles may have a base color, such as green, that is visible when the field display device 530 is off. In another embodiment, the textile material may be mostly colorless when the field display device 530 is off. In still another embodiment, play surface 535 is comprised of multiple layers. In such an embodiment, it is contemplated that each layer may be comprised of different material, material having different light transmission properties, material having different densities, material having different weights, or material having different grains.

As the field display device 530 may be large, it is contemplated that the hybrid craps table 300 has and access area, generally shown at 525. Such an area may provide access for maintenance to the field display device 530. Access area 525 may also serve as a secure area, and house sensitive components of the hybrid craps table 300.

In embodiments, the play surface 535 is devoid of any game information, and all such game information is provided by the field display device 530, which presents such information through the play surface 535. In another embodiment, the play surface 535 may have some game information printed on it while the field display device supplements that information with enhancements or additional information. For example, an operator may desire to have standard house requirements printed right on the play surface 535, so as to be clear and easily viewable, while relying on the field display device 530 to display the remainder of the game information and features. In another embodiment, play surface 535 may have most or even all of the game information printed on it, and the field display device is used primarily to display wagers (e.g., virtual gaming chips).

In other embodiments, craps table 300 does not include one or more of a rigid protective layer 540 and/or a flexible protective layer 545 and/or a play surface 535. In one example, hybrid craps table 300 includes field display device 530 which is comprised of sufficiently protective materials to minimize the need for additional protective layers. In another example, dice that are to be used with the hybrid craps table 300 are comprised of softer material so that they may be rolled directly onto a more rigid surface, such as the rigid protective layer 540 or directly onto the field display device 530. In another example, flexible protective layer 535 may provide enough visual characteristics of felt to be used without an overlaying play surface 535. In further embodiments, hybrid craps table 300 provides different materials at different parts of the play field. For example, play field display device 530 may be provided for the majority of the play field with no play surface 535, so as to allow easier viewing of the displayed content, but the ends of the hybrid craps table 300 comprise a play surface 535, with or without any field display device underneath. In this example, it is contemplated that dice are typically thrown so as to primarily contact and come to rest at the ends of the hybrid craps table, so providing a more-typical play surface 535 at these areas maintains the desired craps play, while still allowing for the various benefits that the hybrid craps table 300 may provide as discussed herein.

FIG. 9 illustrates bumper display devices 510, in accordance with embodiments. It is contemplated that bumper display devices can be any of the before-listed flat-panel display devices, but may not necessarily be the same flat-panel display device as the field display device 530. For example, it may be desirable to utilize an OLED display for the field display device 530, but to then utilize and LED pixel matrix for the bumper display device. In one embodiment, it is also contemplated that the bumper display devices 510 is a separate system from the field display device 530, as discussed more below.

In embodiments, a bumper surface may be overlaid the field display device 530, and may have a somewhat traditional, 3-D texture, perhaps similar to an egg crate padding texture for bedding. In another embodiment, a covering bumper surface has a more uniform texture, so as to possibly facilitate viewing of the content displayed by the bumper display devices 510. It is contemplated that a bumper surface should have similar attributes to the play surface in regards to allowing a player to view the static, dynamic, video, or multimedia presentation from the bumper display devices 510, and to provide sufficient padding so as to properly facilitate the playing of craps and the associated throwing of dice. However, it is also contemplated that a hybrid craps table 300 can comprise bumper display devices 510, with or without a covering bumper surface, while not including a field display device 530, as this would still provide significant improvements over a traditional craps table. Similarly, it is contemplated that a hybrid craps table 300 can comprise a field display device 530 and play surface 535 while not including a bumper display device 510, as this too would still provide significant improvements over traditional craps tables.

In the illustrated embodiment, the play surface 535 both overlays and abuts the field display device 530. It is contemplated that by doing so, the hybrid craps table 300 may have a more finished appearance, and therefore be more acceptable to traditional craps players. However, it is contemplated in another embodiment that the play surface 535 and bumper surface 505 are not distinct surfaces, but rather are comprised of the same materials and are contiguous. In another embodiment, player surface 535 only overlays, but does not abut the field display device 530.

Figure 10:
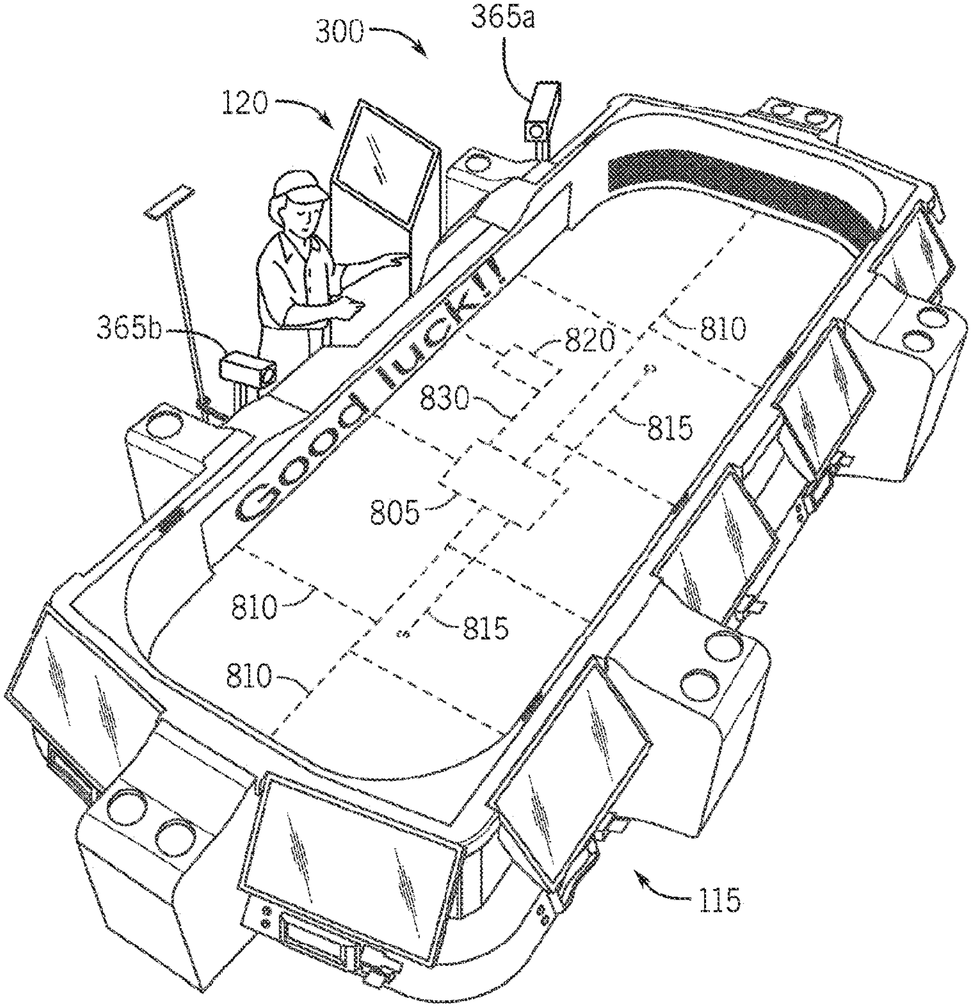
FIG. 10 is a perspective view of a game controller layout of a craps table, according to embodiments of the craps systems of the present disclosure.

FIG. 10 illustrates a simplified controller layout of the craps table 300 in accordance with embodiments of the craps system or craps tables of the present disclosure. It should again be appreciated that while craps table 300 in FIG. 10 is illustrated as a hybrid craps table, in various embodiments, the craps systems herein may instead be a traditional craps table. FIG. 10 illustrates the craps table 300 comprises a plurality of player stations 115 and a dealer station 120. Located beneath the table surface, a game controller 805 is in communication with various components of the craps table 300, as illustrated by the dashed lines. For example, the game controller 805, or game control CPU, may be in communication with each of the player stations 115, as generally indicated by communication lines 810 going to the general vicinity of player stations 115. Game controller 805 is also in communication with the dealer station 120. Further, game controller is in communication with the field display devices, as indicated by communication lines 815. It should be appreciated that the cameras 365*a*-365*d* may also be in communication with the dealer station and the game controller.

In embodiments, a separate bumper display controller 820 is illustrated, which is in communication with the bumper display device. As further illustrated, the bumper display controller 820 may be in communication with the game controller 805. As can be appreciated, and as discussed in more detail below, it is contemplated that in some embodiments, the game controller may communicate directly with the bumper display device, so there would be no need for the bumper display controller 820. In other embodiments, the bumper display system is completely separate, so there would be no direct communication line 830. However, in this FIG. 10, communication line 830 is being shown to provide an example of one embodiment where game controller 805 is not in direct communication with the bumper display device, but does have a communication line which might allow for coordination of certain displays.

In embodiments, it is contemplated that the bumper display device can be managed separately from the game controller 805, which may be desirable by operators. However, through communication line 830, it is still possible to coordinate certain display, perhaps for a bonus or other game feature. It is further contemplated that bumper display controller is a specialized controller in order to manage the bumper display, which again, may be a different type of display from the field display devices. It can be appreciated that having specialized display controllers may provide for easier maintenance of the overall hybrid craps table.

Figure 11:
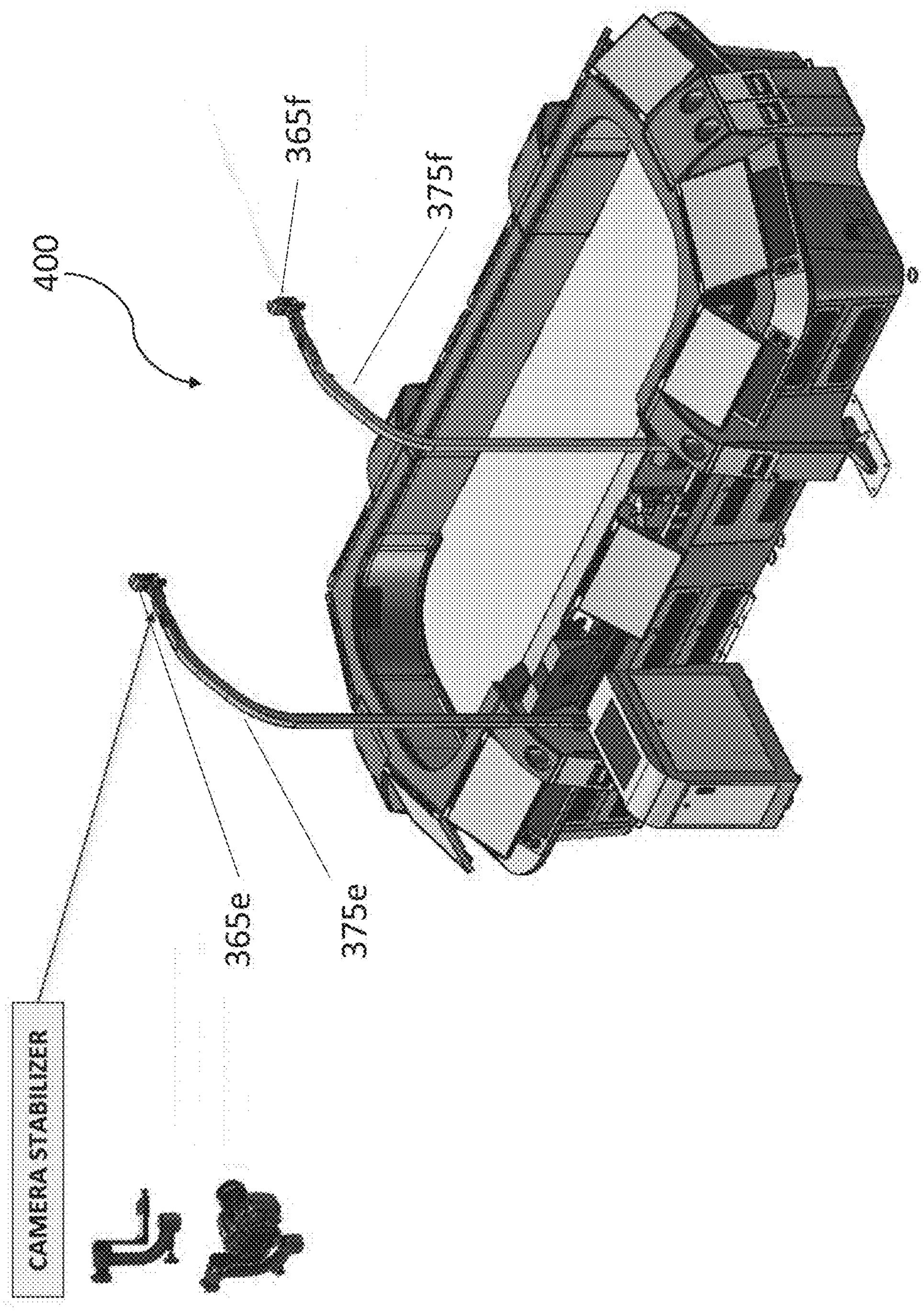
FIG. 11 is a perspective view of a craps table illustrating two example cameras and camera mounts, according to embodiments of the craps systems of the present disclosure.

Referring now to FIG. 11, FIG. 11 illustrates a perspective view of a craps table 400 according to embodiments of the craps system of the present disclosure. It should be appreciated that craps table 400 is similar to the other craps tables and systems described above (e.g., craps table 300). Here, craps table 400 may comprise two cameras 365*e*, 365*f* and the two cameras 365*e*, 365*f* may be mounted on respective poles 375*e*, 375*f*. The poles 375*e*, 375*f* may be attached to the table 400, e.g., attached near a base of the table 400, or be structurally separated from the table 400. Poles 375*e*, 375*f* may extend generally upward from a base portion (e.g., a rounded or rectangular base sitting on the floor) and may comprise a curved portion that extends over the play field of the table 400. Cameras 365*e*, 365*f* may be mounted on poles 375*e*, 375*f* so as to be positioned generally over a center line extending longitudinally (or center region in the longitudinal direction) of the play field of craps table 400. Thus, each of the cameras 375*e*, 375*f* may be positioned at an elevation above the craps table 400 such that the field of view of the camera is pointed generally downwardly or vertically downwardly onto the craps table or the play field of the craps table. In examples, one or both of the cameras 365*e*, 365*f*, may be mounted or coupled to its respective pole 375*e*, 375*f* by a camera stabilizer (e.g., a device such as the element labeled "CAMERA STABILIZER") located between the pole 375*e*, 375*f* and the camera 365*e*, 365*f* so as to reduce or eliminate vibrations and/or noise that may be transmitted to the camera(s) 365*e*, 365*f*. It should be appreciated that such stabilizers may be utilized in any of the cameras described herein.

Figure 12A:
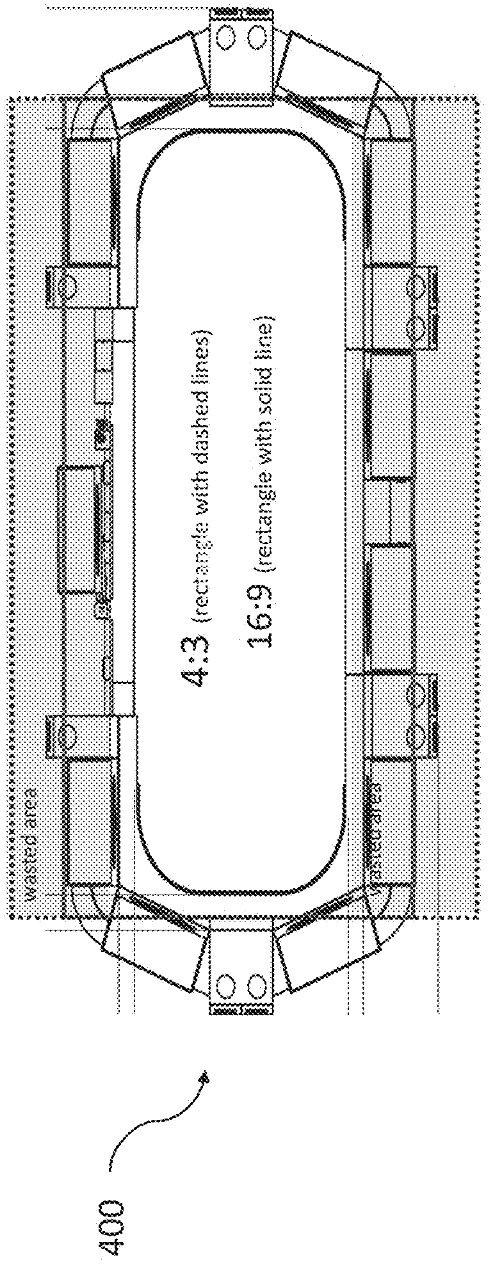
FIGS. 12A, 12B are top views of the craps table of FIG. 11 illustrating advantages of two example cameras and positioning of same, according to embodiments of the craps systems of the present disclosure.
Figure 12B:
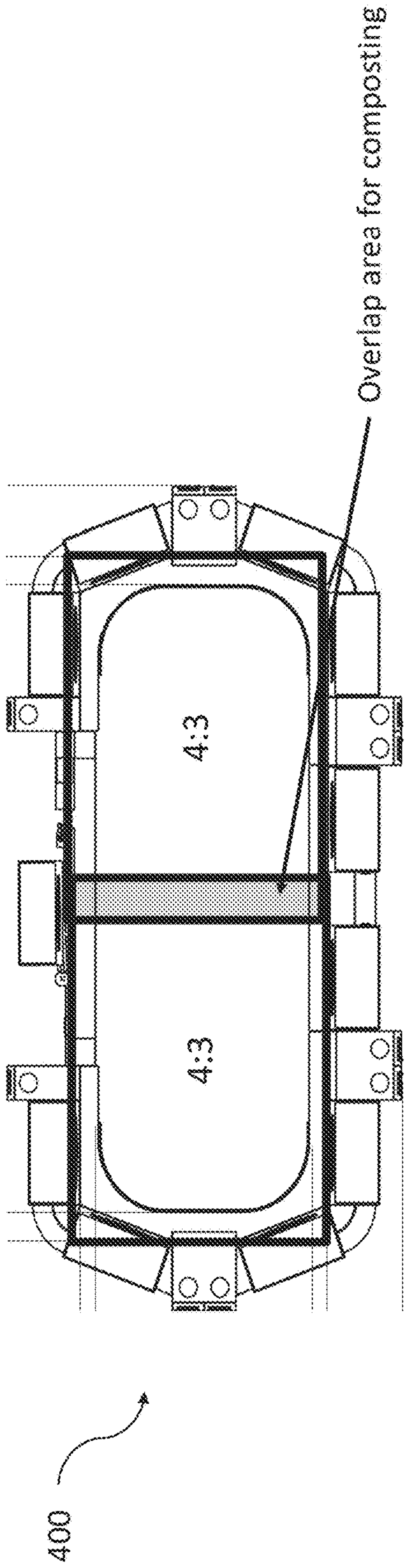

Capturing or recording video or images of an entire play field of a craps table, e.g., craps table 300 or craps table 400 (which may require or have an aspect ratio of 24:9, i.e., 24 units per 9 units), with a single camera (which typically may have an aspect ratio of 16:9 or 4:3) may be inefficient because it can result in a lot of wasted angle of view. FIG. 12A illustrates a schematic of the example craps table 400 in which the angle of views for either a single camera having a 4:3 aspect ratio camera (illustrated by the dashed lines forming a rectangle generally surrounding a perimeter area of the table 400) or a single camera having a 16:9 aspect ratio (illustrated by the solid or red lines forming a rectangle generally surrounding a perimeter area of the table 400). The shaded area labeled "wasted area" in FIG. 12A illustrates the wasted angles of view using such single cameras. However, using two cameras, for example, two cameras 365*e*, 365*f* mounted as illustrated by craps table 400 of FIG. 11 in which each of the two cameras have, for example, 4:3 aspect ratios and in which an overlap is provided when synthesizing images from the two cameras, an efficient angle of view arrangement can be achieved. FIG. 12B illustrates schematically two such angle of views for cameras having 4:3 aspect ratio and in which an overlap area is provided. Thus, it should be appreciated that two cameras may be advantageously selected to be positioned or mounted at an elevated position as illustrated and described. In examples, the cameras may be posited generally at the top of the center of each shooting area or range of the craps table 400. Armrests of the craps table 400 may be included in the angles of view so as to be sure the cameras capture the bouncing of the dice off the respective wall(s). In examples, the cameras 365*e*, 365*f* illustrated in the craps table 400 of FIG. 11, or any other cameras in any of the other craps tables or craps system herein, may comprise a global shutter camera or a high frame rates per second camera so that the object(s) for which the camera(s) are recording or taking image(s) of, e.g., the dice being thrown, do not stretch in a direction of movement. A rolling shutter camera may also be used with a relatively short exposure time in various examples. One or more high-resolution cameras may be used, and, in various examples, a single high-resolution camera may be used to cover the entire play field of the craps table or craps system. It should be appreciated from the foregoing that the use of two cameras, e.g., the cameras as illustrated and described with respect to FIGS. 11, 12A, 12B, may require less processing or computing capability and thus advantageous when, for example, the camera(s) are utilized with any one or more of the computing devices herein.

Figures 13A, 13B:
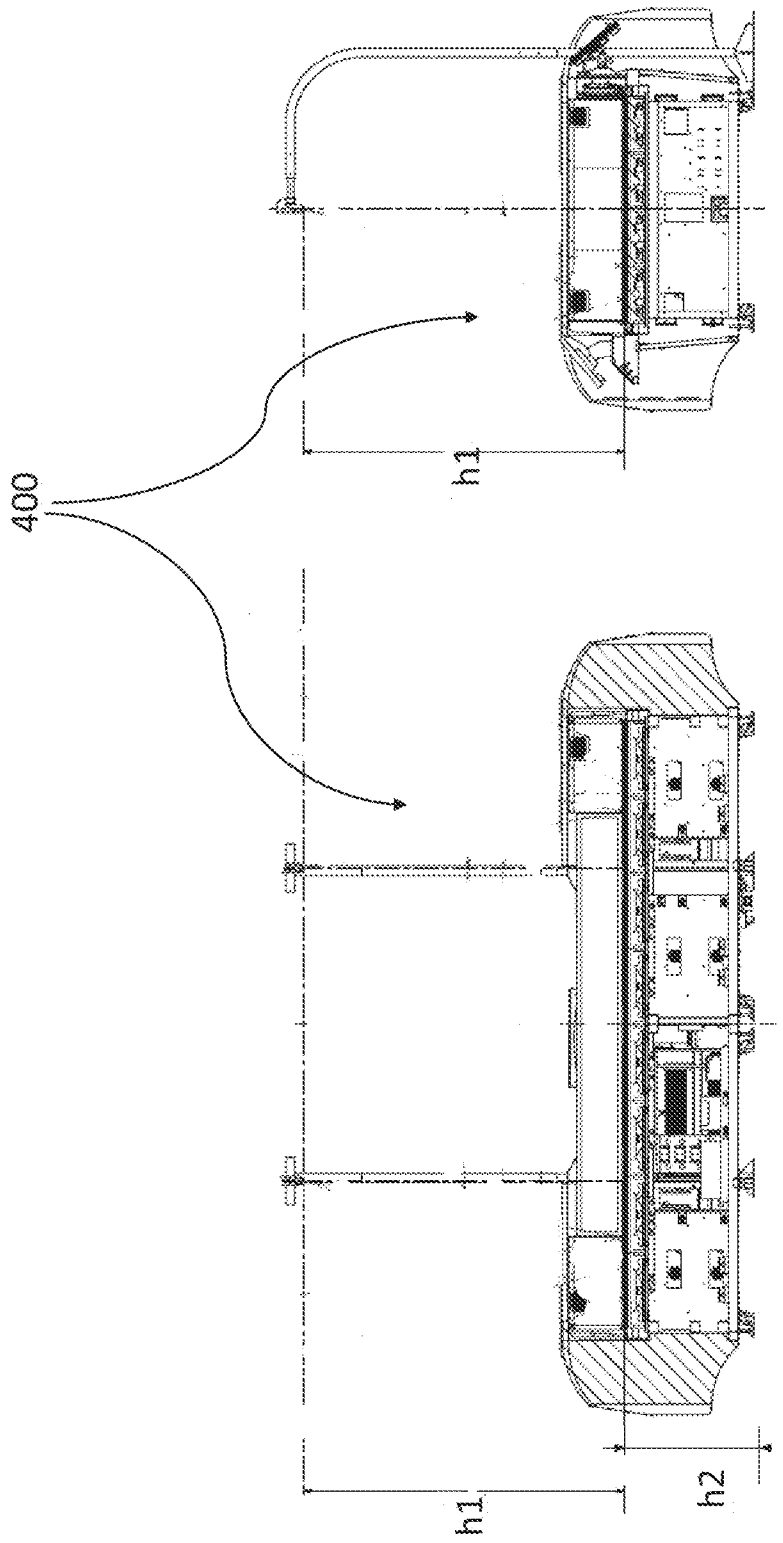
FIGS. 13A, 13B are sectional views of the craps table of FIG. 11 illustrating example camera mounting heights, according to embodiments of the craps systems of the present disclosure.

FIG. 13A and FIG. 13B are sectional views of the example craps table 400 of FIG. 11 illustrating example heights according to embodiments of the present disclosure. The height h1 represents an example height from a top surface of the play field of craps table 400 (or any other craps tables herein) to any of the cameras herein that are positioned or mounted at an elevation above the craps table so that the field of view generally points downwardly onto the play field of the craps table (as described herein). In various examples, the height h1 may be advantageously selected to be between 1690 mm and 1822.7 mm. In some examples, the height h1 may be 1690 mm or 1700 mm. The height h2 represents an example height from the ground to the top surface of the play field of craps table 400 (or any other tables herein). In various examples, such height h2 may be around 677 mm or 677.33 mm. It should be appreciated that heights h1 and h2 may be heights for any of the craps tables herein and that heights h1 and/or h2 may be any other suitable heights that allow for any of the images, video recordings and/or the dice counting, dice tracking or dice outcome determinations described herein. It has also been discovered that by selecting an advantageous position and/or height that the camera(s) are located relative to the play surface of a craps table, the effects outside or ambient light may have on the camera, e.g., the effects on processing or recording of images from the camera(s), may be minimized. Applicant has attempted to quantify the effects such outside light may have on such cameras so as to be able to select a height and/or position for the cameras suitable for minimizing such effects. In various examples, the positions described herein and the heights, such as heights h1 or h2 may provide for such minimization.

In embodiments, the hybrid craps table may be configured as a hybrid gaming table, and configured to easily convert into another style of wagering game. For example, it is contemplated that a hybrid gaming table can easily change its appearance and convert to a traditional table horse-racing game, as are known in the industry. As the tables of a craps game and a horse-racing game can roughly be the same size and shape, the change of the field display from a craps game to a horse-racing game would not cause much confusion. This embodiment would provide additional flexibility and efficiencies for casino operators, who would then be able to reconfigure the hybrid gaming table according to particular customer demands. In another embodiment, the hybrid gaming table can function as a Sic Bo gaming table. In one example, such a Sic Bo game can allow a player to throw the physical dice. Current commercial implementations of Sic Bo do not allow the player to throw the dice, as this process is typically completely automated. It is contemplated that the present disclosure provides a particular benefit in allowing the player to throw physical dice, thereby increasing player participation and enjoyment of the traditionally fully automated game. In another embodiment, the hybrid gaming table can function as a racing game, similar to a horse-racing game, but displaying different racing elements, such as cars, chariots, boats, or other racing elements. In another embodiment, the hybrid gaming table primarily functions as a game other than craps, such as Sic Bo. In a further embodiment, the hybrid gaming table only functions as an alternative game, such as Sic Bo.

It should be appreciated from the foregoing that the craps systems or tables of the present disclosure greatly improve the security and flow of a craps game. It should also be appreciated from the foregoing that that at least one cameras herein can be configures such that the image(s) or video provided thereby can be relayed to any one or more of the player stations along with the the dealer station, so that the throw or roll of the dice can be visually reproduced on one or more of the respective displays. In various examples, such image(s) or video, player station(s) and/or the dealer station may be caused to reproduce a throw or roll of the dice in slow motion which may provide added anticipation and excitement for a player and added security.

In embodiments, the at least one camera 365 may be associated with the craps systems or tables herein to monitor the throwing motion of the dice by a player. In various examples, the player is not given physical dice to throw, but rather is instructed when they are allowed to throw, and performs a throwing motion. In such examples, the at least one camera may track the player's motion, and cause an automated dice roll to occur in coordination with the detected throwing motion. In embodiments, the automated dice roll is a roll of virtual dice, which are caused to be displayed on the play surface of the craps tables herein. In one example, the results of the virtual dice roll are determined by an RNG or pseudo-RNG. In various examples, the craps systems herein receive at least one random number from an RNG. The systems then utilize the random number or numbers to determine the results of the dice roll, and cause the virtual dice to display such results. In other examples, the detected throwing motion triggers the request by the system to receive at least one random number from the RNG. In further examples, each virtual dice is associated with a distinct random number, so the systems receive two generated random numbers and associates each with received random number with a distinct result for each dice.

In further embodiments, the automated dice roll utilizes physical dice. In examples, the craps systems or tables herein are configured to shake the dice on a dice shaker. In other examples, the hybrid crapes systems or tables herein are configured to shoot the dice from a position close to the player who is the acting shooter. In such examples, it is contemplated that the craps tables or systems herein may further comprise an automated dice retrieval system, which would be configured to collect the thrown dice, and return them to the automated dice throwing system. In further examples, the automated dice throwing system may utilize compressed air to launch the dice. In other examples, the automated dice throwing system may utilize mechanical means to launch the dice, such as a spring or lever action.

It is contemplated that several of the embodiments taught herein will provide efficiencies to operators. For example, it is contemplated that a hybrid craps table will only require a single dealer/attendant, as opposed to the two to three attendants currently required to run a traditional craps table. Further, it is contemplated that without the need to accurately track and account for physical betting chips, the casinos will see a significant reduction in the working hours required to transport and account for such physical chips. Other anticipated efficiencies include the ability to more accurately track player activities as they relate to player tracking programs. It is further anticipated that since payouts will be automated, game play speed will be improved as there will be less down time as attendants are not required to go around and collect or payout chips on each of the wagers. These efficiencies, and combined with the contemplated improved security, should make hybrid craps tables very attractive to operators.

Reference to software in the present disclosure may encompass one or more computer programs that may encompass data, instructions, or both.

One or more tangible and non-transitory computer-readable media may store or otherwise embody software implementing particular embodiments. A tangible computer-readable medium may be any tangible medium capable of carrying, communicating, containing, holding, maintaining, propagating, retaining, storing, transmitting, transporting, or otherwise embodying software, where appropriate. A tangible computer-readable medium may be a biological, chemical, electronic, electromagnetic, infrared, magnetic, optical, quantum, or other suitable medium or a combination of two or more such media, where appropriate. Example tangible, non-transitory computer-readable media include, but are not limited to, application-specific integrated circuits (ASICs), compact discs (CDs), field-programmable gate arrays (FPGAs), floppy disks, floptical disks, hard disks, holographic storage devices, magnetic tape, caches, programmable logic devices (PLDs), random-access memory (RAM) devices, read-only memory (ROM) devices, semiconductor memory devices, and other suitable computer-readable media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose or specific-purpose computer system may execute software implementing particular embodiments, where appropriate.

Further examples are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure.

What is claimed is:

1. A craps system, comprising:

a play field comprising:

a first end portion, and a second end portion located opposite the first end portion;

a first bumper wall positioned adjacent to the play field at the first end portion of the play field;

a second bumper wall positioned adjacent to the play field at the second end portion of the play field;

at least one camera;

at least one dealer station comprising:

at least one dealer station memory, at least one dealer station display device, and at least one dealer station processor in communication with the at least one camera, the at least one dealer station memory device, and the at least one dealer station display device, the at least one dealer station processor configured to:

receive from the at least one camera information relating to a throw of dice for a play of a craps game;

analyze the information received from the at least one camera using a machine learning model trained to recognize features of dice throws, and determine, based at least in part on the output of the machine learning model, whether the throw of the dice complies with one or more requirements for a proper throw of dice, the one or more requirements comprising at least one of: (i) determining whether the dice hit the first bumper wall or the second bumper wall, (ii) determining whether the dice hit the first bumper wall when the dice should have hit the second bumper wall, (iii) determining whether the dice hit the second bumper wall when the dice should have hit the first bumper wall, (iv) determining whether one of the dice did not come to a stop on the play field, (v) determining whether the dice tumbled, and (vi) determining whether the dice tumbled less than a predetermined number of times;

cause the at least one dealer station display device to display information related to the determination of whether the throw of the dice complies with the one or more requirements; and determine whether to proceed with the play of the craps game based at least in part upon (a) the determination of whether the throw of the dice complies with the one or more requirements, and (b) input received at the dealer station by a dealer using the information displayed on the at least one dealer station display device related to the determination of whether the throw of the dice complies with the one or more requirements.

2. The craps system of claim 1, wherein the at least one camera includes:

a first camera positioned above the play field and with a first field of view oriented generally horizontally along a top surface of the play field and the first field of view including the first end portion of the play field;

a second camera positioned above the play field and with a second field of view oriented generally horizontal along the top surface of the play field and the second field of view including the second end portion of the play field.

3. The craps system of claim 1, wherein the at least one camera includes:

a third camera positioned above the play field and with a third field of view oriented generally downward toward a top surface of the play field and the third field of view including the first end portion of the play field;

a fourth camera positioned above the play field and with a fourth field of view oriented generally downward toward the top surface of the play field and the fourth field of view including the second end portion of the play field.

4. The craps system of claim 3, wherein the third field of view and the fourth field of view overlap each other at least in part.

5. The craps system of claim 1, wherein the input received at the dealer station indicates a confirmation from the dealer that the dealer agrees with the determination of whether the throw of the dice complies with the one or more requirements.

6. The craps system of claim 1, wherein the dealer station is further configured to:

determine an outcome of the throw of the dice, and in response to a determination to proceed with the play of the craps game, pay any winning wagers based on the determined outcome.

7. The craps system of claim 1, further comprising:

an automated dice recognition system including circuitry within the dice;

and wherein the determination of whether the throw of the dice complies with the one or more requirements is additionally based on a determination of the automated dice recognition system.

8. The craps system of claim 1, wherein the determination of whether the throw of the dice complies with the one or more requirements is based on a determination, from the information received from the at least one camera, of at least one of a tracked location of the dice on the play field, a count of the dice, and an outcome of the throw of the dice.

9. A method for controlling a craps system, comprising:

receiving from at least one camera information relating to a throw of dice for a play of a craps game on a craps table having a first bumper wall, a second bumper wall, and a play field;

analyzing the information received from the at least one camera using a machine learning model trained to recognize features of dice throws, and determine, based at least in part on the output of the machine learning model, whether the throw of the dice complies with one or more requirements for a proper throw of the dice, the determination of whether the throw of the dice complies with one or more requirements comprising at least one of: (i) determining whether the dice hit the first bumper wall or the second bumper wall, (ii) determining whether the dice hit the first bumper wall when the dice should have hit the second bumper wall, (iii) determining whether the dice hit the second bumper wall when the dice should have hit the first bumper wall, (iv) determining whether one of the dice did not come to a stop on the play field, (v) determining whether the dice tumbled, or (vi) determining whether the dice tumbled less than a predetermined number of times;

outputting, to a dealer station, information related to the determination of whether the throw of the dice complies with one or more requirements;

determining whether to proceed with the play of the craps game based at least in part upon (a) the determination of whether the throw of the dice complies with one or more requirements, and (b) input received at a dealer station associated with the craps table related to the determination of whether the throw of the dice complies with one or more requirements; and outputting an indication of the determination of whether to proceed with the play of the craps game.

10. The method of claim 9, wherein the at least one camera includes:

a first camera positioned above the play field and with a first field of view oriented generally horizontally along a top surface of the play field and the first field of view including a first end portion of the play field;

a second camera positioned above the play field and with a second field of view oriented generally horizontal along the top surface of the play field and the second field of view including a second end portion of the play field.

11. The method of claim 9, wherein the at least one camera includes:

a third camera positioned above the play field and with a third field of view oriented generally downward toward a top surface of the play field and the third field of view including the first end portion of the play field;

a fourth camera positioned above the play field and with a fourth field of view oriented generally downward toward the top surface of the play field and the fourth field of view including the second end portion of the play field.

12. The method of claim 11, wherein the third field of view and the fourth field of view overlap each other at least in part.

13. The method of claim 9, wherein the input received at the dealer station indicates a confirmation from a dealer that the dealer agrees with the determination of whether the throw of the dice complies with the one or more requirements.

14. The method of claim 9, further comprising:

determining a outcome of the throw of the dice, and in response to a determination to proceed with the play of the craps game, paying any winning wagers based on the determined outcome.

15. The method of claim 9, further comprising:

receiving a determination regarding the throw of the dice from an automated dice recognition system including circuitry within the dice;

and wherein the determination of whether the throw of the dice complies is additionally based on the determination from the automated dice recognition system.

16. The method of claim 9, wherein the determination of whether the throw of the dice complies with the one or more requirements is based on a determination, from the information received from the at least one camera, of at least one of a tracked location of the dice on the play field, a count of the dice, and an outcome of the throw of the dice.

* * * * *